US012094364B2

(12) United States Patent
Alton et al.

(10) Patent No.: US 12,094,364 B2
(45) **Date of Patent: *Sep. 17, 2024**

(54) VEHICLE WHIP SYSTEM

(71) Applicant: NGL Lighting Supply, Inc., Salt Lake City, UT (US)

(72) Inventors: Kennie Alton, Herriman, UT (US); Stanley Thurgood, Hooper, UT (US)

(73) Assignee: NGL Lighting Supply, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,429

(22) Filed: Feb. 21, 2023

(65) Prior Publication Data

US 2024/0038105 A1 Feb. 1, 2024

Related U.S. Application Data

(63) Continuation of application No. 17/169,360, filed on Feb. 5, 2021, now Pat. No. 11,605,318.

(60) Provisional application No. 62/981,631, filed on Feb. 26, 2020, provisional application No. 62/971,007, filed on Feb. 6, 2020.

(51) Int. Cl.
*G09F 21/04* (2006.01)
*G09F 13/22* (2006.01)
*G09F 17/00* (2006.01)

(52) U.S. Cl.
CPC .............. *G09F 21/04* (2013.01); *G09F 13/22* (2013.01); *G09F 17/00* (2013.01); *G09F 2013/222* (2013.01); *G09F 2017/0066* (2013.01); *G09F 2017/0075* (2013.01)

(58) Field of Classification Search
CPC .......... G09F 21/04; G09F 13/22; G09F 17/00; G09F 2013/222; G09F 2017/0066; G09F 2017/0075
See application file for complete search history.

(56) References Cited

U.S. PATENT DOCUMENTS

2008/0155872 A1* 7/2008 Brengman .............. G09F 21/04 40/592
2010/0288905 A1* 11/2010 Shaffstall ................ G09F 21/04 248/540

(Continued)

FOREIGN PATENT DOCUMENTS

FR 2701787 A1 8/1994

OTHER PUBLICATIONS https://www.amazon.com/Gorilla-Whips-XTREME-Safety-remote/dp/B01C5J1T4E retrieved Feb. 5, 2021.

(Continued)

*Primary Examiner* — Mary Ellen Bowman
(74) *Attorney, Agent, or Firm* — Lowenstein Sandler LLP

(57) ABSTRACT

A whip system includes a base component including a first electrical connector disposed in a base housing and one or more wires coupled to the first electrical connector and routed through the base housing. The whip system further includes a collar component including a second electrical connector disposed in a collar housing and configured to electrically couple with the first electrical connector. The vehicle whip system further includes a whip component configured to couple to the one or more wires via the first electrical connector and the second electrical connector.

20 Claims, 12 Drawing Sheets

(56) References Cited

U.S. PATENT DOCUMENTS

| | | | | |
|---|---|---|---|---|
| 2019/0251881 | A1* | 8/2019 | Anderson | H01Q 1/27 |
| 2020/0328494 | A1* | 10/2020 | Stehlik | H01Q 1/085 |

OTHER PUBLICATIONS https://www.amazon.com/Niwaker-Control-Dancing-Chasing-Antenna/dp/B087CG1Z4V/ref=psdc_404797011_t3_B07J5S836M retrieved Feb. 5, 2021.
https://www.amazon.com/AL4X4-Wrapped-Dancing-Controlled-Polaris/dp/B07ZF9YZK1?th=1 retrieved Feb. 5, 2021.
https://www.amazon.com/LED-Wireless-Weatherproof-Lighted-Antenna/dp/B07J5S836M?th=1 retrieved Feb. 5, 2021.
https://www.amazon.com/LED-Wireless-Weatherproof-Lighted-Antenna/dp/B071HHQPKY retrieved Feb. 5, 2021.
YouTube: "MB Whips E-Spektrum LED Whip Demonstration", Nov. 24, 2018, 42 pages, [Downloaded on May 3, 2024] Retrieved from [URL: https://www.youtube.com/watch?v=kTgltDyA-BY].
YouTube: "E-Spektrum Sync'd LED Whip Pair", Nov. 24, 2018, 71 pages, [Downloaded on May 3, 2024] Retrieved from [URL: https://www.youtube.com/watch?v=UD9dNG24XIU].
YouTube: "MB Whips Flash Synchronized LED Whip Pair Overview on our CanAm X3", Aug. 20, 2020, 37 pages, [Downloaded on May 8, 2024] Retrieved from [URL: https://www.youtube.com/watch?v=PLGbF2gM_o4].
YouTube: "MB Whips Flash LED Whip Pair In Depth Overview", Oct. 6, 2020, 42 pages, [Downloaded on May 8, 2024] Retrieved from [URL: https://www.youtube.com/watch?v=j2i75X5sYQg].
YouTube: "NGL ATV/UTV LED Flag Whip Improved for 2020", Feb. 1, 2020, 41 pages, [Downloaded on May 8, 2024] Retrieved from [URL: https://www.youtube.com/watch?v=Dm1RpklAzcQ].
YouTube: "NGL's Flexible ATV/UTV Flag Whip", May 21, 2020, 31 pages, [Downloaded on May 8, 2024] Retrieved from [URL: https://www.youtube.com/watch?v=NWzRdziKvAg].
YouTube: "you install 2", Jun. 23, 2020, 33 pages, [Downloaded on May 8, 2024] Retrieved from [URL: https://www.youtube.com/watch?v=ihTexL4Ects].
Facebook: "Next Generation Lightning", Sep. 26, 2020, 01 page, [Downloaded on May 8, 2024] Retrieved from [URL: https://www.facebook.com/photo/?fbid=1042507372866893&set=pcb.1042507506200213].
Facebook: "Your Flag Whips are the Perfect Weekend Project!", Jun. 17, 2020, 01 page, [Downloaded on May 8, 2024] Retrieved from [URL: https://www.facebook.com/watch/?v=306336873722191].
Facebook: "Next Generation Lightning", Nov. 23, 2018, 01 page, [Downloaded on May 8, 2024] Retrieved from [URL: https://www.facebook.com/photo/?fbid=582314778886157&set=a.294322837685354].
Facebook: "Next Generation Lightning", 01 page, [Downloaded on May 8, 2024] Retrieved from [URL: https://www.facebook.com/nglscorp].
Facebook: "Flex Whip Series", 01 page, [Downloaded on May 8, 2024] Retrieved from [URL: https://scontent-sea 1-1.xx.fbcdn.net/v/t1.6435-9/31486822_447348322382804_7698243929027641344_n.jpg?_nc_cat=102&ccb=1-7&_nc_sid=5f20].

* cited by examiner

VEHICLE WHIP SYSTEM

RELATED APPLICATIONS

This application is a continuation of U.S. Non-Provisional application Ser. No. 17/169,360, filed Feb. 5, 2021, which claims the benefit of U.S. Provisional Application No. 62/981,631, filed Feb. 26, 2020, and U.S. Provisional App. No. 62/971,007, filed Feb. 6, 2020, the entire contents of which are incorporated by reference.

BACKGROUND

Flag whips have been mounted to vehicles, such as off-road vehicles. The flag whip includes a flag mounted to a pole so that the flag projects high enough from the vehicle to be seen while the vehicle is in motion. The flag indicates the position of the vehicle which can be helpful for safety reasons.

BRIEF DESCRIPTION OF DRAWINGS

The examples described herein will be understood more fully from the detailed description given below and from the accompanying drawings, which, however, should not be taken to limit the application to the specific examples, but are for explanation and understanding only.

DETAILED DESCRIPTION

Figure 1B:
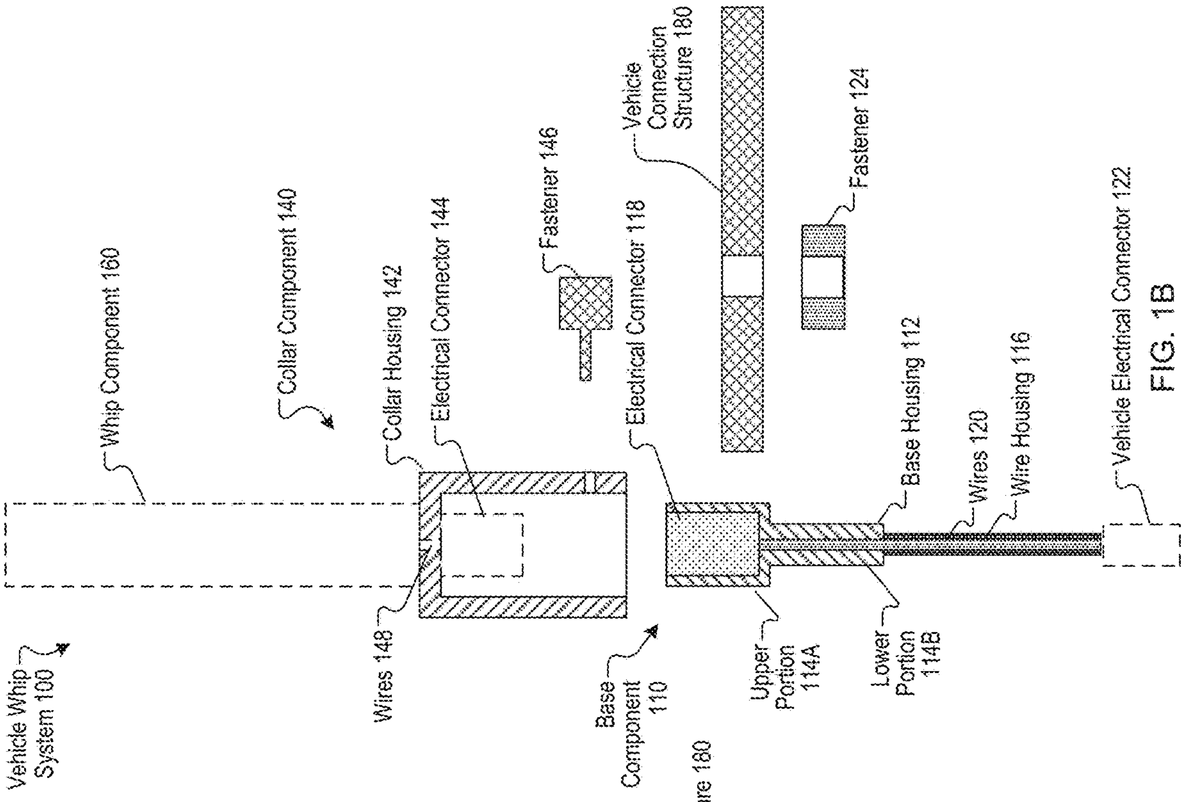
FIGS. 1A-G illustrate views of vehicle whip systems, according to certain embodiments.

Embodiments described herein are related to vehicle whip systems.

A whip is a pole, rod, tube, or antenna mounted to a vehicle. A whip may be mounted to the vehicle via one or more existing holes in the vehicle (e.g., along the bumper) or a hole drilled in the vehicle (e.g., in the truck bed). A flag or other object can be secured to a whip. A whip and flag may be used on a vehicle to provide visibility of the vehicle. For example, a flag (e.g., sand flag) attached to a whip may be mounted to a vehicle (e.g., off-road vehicle) during operation on sandy or dusty terrain. The whip (e.g., long, slender, whip-like pole) may project high enough from the vehicle (e.g., at least eight feet from the surface of the ground) to be visible above the dust or sand cloud generated while the vehicle is in motion. The flag may indicate the position of the vehicle within the cloud for safety reasons. A flag attached to a whip mounted to a vehicle (e.g., bicycle) in urban areas or other areas allows the vehicle to be more visible when in front of a tall vehicle or obscured by another object (e.g., vehicle, vegetation, sand dune, etc.). The whip may have a substantially vertical orientation when the vehicle is stopped (e.g., and when the vehicle is moving). In some locations, a flag and whip are to be used, for example, for non-highway registered vehicles (e.g., in vehicular recreation areas) or for all vehicles (e.g., in sand dunes area). Some whips have electrical components and associated electrical wiring that is disposed outside of the whip.

Conventionally, a whip, components used to connect the whip to the vehicle, electrical wiring, and/or the like may become damaged or break due to contact with (e.g., snagging on, hitting, being whipped against, etc.) foreign objects, such as brush, trees, etc. Some conventional whips are connected to a vehicle at a location where the whip, components used to connect the whip to the vehicle, electrical wiring, and/or the like are closer to foreign objects and are more likely to be damaged. Some conventional whips are connected to a vehicle at a location that is close to the ground which may cause the whips to be more likely to be damaged and to be more difficult to be seen (e.g., at a lower height).

Conventionally, a whip, components used to connect the whip to the vehicle, electrical wiring, controller used to control electrical components of the whip, etc. may be difficult to connect and disconnect. Some whips are rigid and add extra stress to the vehicle and/or the components used to connect the whip to the vehicle. Some controllers of electrical components of whips are permanently connected (e.g., fused) to a whip, so that the whip fails and is to be discarded when the controller fails. Some whips are controlled via a remote controller that can be easily lost or damaged.

The devices, systems, and methods disclosed herein provide a vehicle whip system. A vehicle whip system includes a base component, a collar component, and a whip component (e.g., flag whip).

The base component includes a base housing, an electrical connector disposed in the base housing, and wires (e.g., positive, negative, control, ground) routed through the base housing. The base housing may include an upper portion that has a larger diameter and a lower portion that has a smaller diameter. The electrical connector may be disposed in the upper portion of the base housing. A wire housing (e.g., flexible wire housing) may be disposed between the lower portion of the base housing and a vehicle electrical connector. The wires may be coupled to the electrical connector and may be routed from the electrical connector, through the lower base housing, through the wire housing, and to the vehicle electrical connector. The lower portion of the base housing (e.g., and the wire housing and the vehicle electrical connector) may be routed through an opening in a vehicle connection structure (e.g., bracket, trailer hitch adaptor, etc.) that is attached to the vehicle (e.g., the rear-tire mount, the trailer hitch, a roll bar, etc.). A fastener (e.g., nut) may secure the base component to the vehicle connection structure.

The collar component may include a collar housing forming an interior volume and an electrical connector disposed in the interior volume of the collar housing. The collar component is configured to be disposed on the base component (e.g., receive the upper portion of the base component) so that the electrical connector of the base component and the electrical connector of the collar component electrically couple (e.g., and physically couple) with each other.

The whip component may be coupled to (e.g., connected to, integral with, etc.) the collar housing. The whip component includes one or more electrical components configured to couple to the one or more wires (e.g., connected to a vehicle power source via the vehicle electrical connector) via the electrical connector of the collar component and the electrical connector of the base component.

In some embodiments, the vehicle connection structure is a vehicle whip bracket that includes a first portion and a second portion. The first portion is configured to be secured in a substantially vertical orientation to a rear-tire mount (e.g., spare-tire mount) of a vehicle. The second portion is disposed in a substantially horizontal orientation to secure a whip in a substantially vertical position. Interior control wires of the vehicle are to electrically couple to wires (e.g., interior control wires of the whip) through the second portion of the flag whip bracket. The base component of the whip may be configured to connect to the vehicle whip bracket.

The vehicle whip bracket may be configured to allow whips to be secured to a vehicle. The vehicle whip bracket may be configured to fit on the rear-tire housing (e.g., be configured to be used with any vehicle that has a rear-tire mount). The vehicle whip bracket may provide a unique design to different vehicles (e.g., different brackets may be used for different years and models of vehicles). The vehicle whip bracket may not interfere with the vehicle body style or type.

The vehicle whip bracket may have a clean mounting assembly that does not interfere with wiring of the whip. Two separate brackets may be used for each whip for maximum strength. The vehicle whip bracket may be made from aluminum (e.g., 5052 aluminum, anodized aluminum, to provide durability and strength), steel, stainless steel, and/or the like. The vehicle whip brackets may be designed for discreet installation and removal. The vehicle whip bracket may use vehicle nuts to mount (e.g., no excess parts to acquire).

In some embodiments, power and control wires are part of the base component. The base component may use a 4-pin power jack connector with machined modifications. The base component may provide a quick disconnect function.

The vehicle whip system (e.g., base component, collar component, whip component, vehicle connection structure, etc.) may be used for one or more of all-terrain vehicles (ATVs), utility task vehicles (UTV), Flag-pole tops, Jazzy, golf carts, jeeps, snowplows, trucks, sand rails, boats, motorcycles, spiders, bicycles, or the like. In some embodiments, the vehicle whip system is used with vehicles that have a rear-tire mount.

The vehicle whip system may be used on tight trails with low branches, may provide a visual indication to other users of the location of the vehicle using the vehicle whip system, and/or may have LEDs that can be set to music.

The vehicle whip system may be configured for electrical components to be fully contained in the quick release mounting assembly (e.g., base component and collar component). The vehicle whip system may have a base component and a collar component that are separate assembly parts for maximum strength. The whip component may include poly tube for flexibility and strength. The vehicle whip system may include a whip component and a controller that are separate. The vehicle whip system may be associated with a phone app that may eliminate a dedicated remote. The collar housing may couple to the upper portion of the base housing via a fastener (e.g., thumb screw, set screw) for easy install and removal of the whip component and collar component from the base component. The vehicle whip system may include a cap (e.g., dust cap, etc.) configured to be disposed on the upper portion of the base housing (e.g., when the collar housing is not disposed on the base housing) to prevent dirt and moisture from entering the electrical connector of the base component.

The devices, systems, and methods of the present disclosure have advantages over conventional solutions. The vehicle whip system of the present disclosure routes the wires (e.g., positive, negative, control, and ground) within the vehicle whip system (e.g., base component) so that the wires are less likely to break and be damaged than conventional solutions. The vehicle whip system of the present disclosure has the wires disposed in the base housing so that the collar component and whip component can be removed from the vehicle (e.g., switched with a different collar component and whip component) without disconnecting the wiring. The vehicle whip system of the present disclosure allows switching of whips without removing the base component from the vehicle. The vehicle whip system of the present disclosure may allow for mounting a whip at a location where damage is less likely to occur and where the whip is more visible than conventional solutions.

Figure 1A:
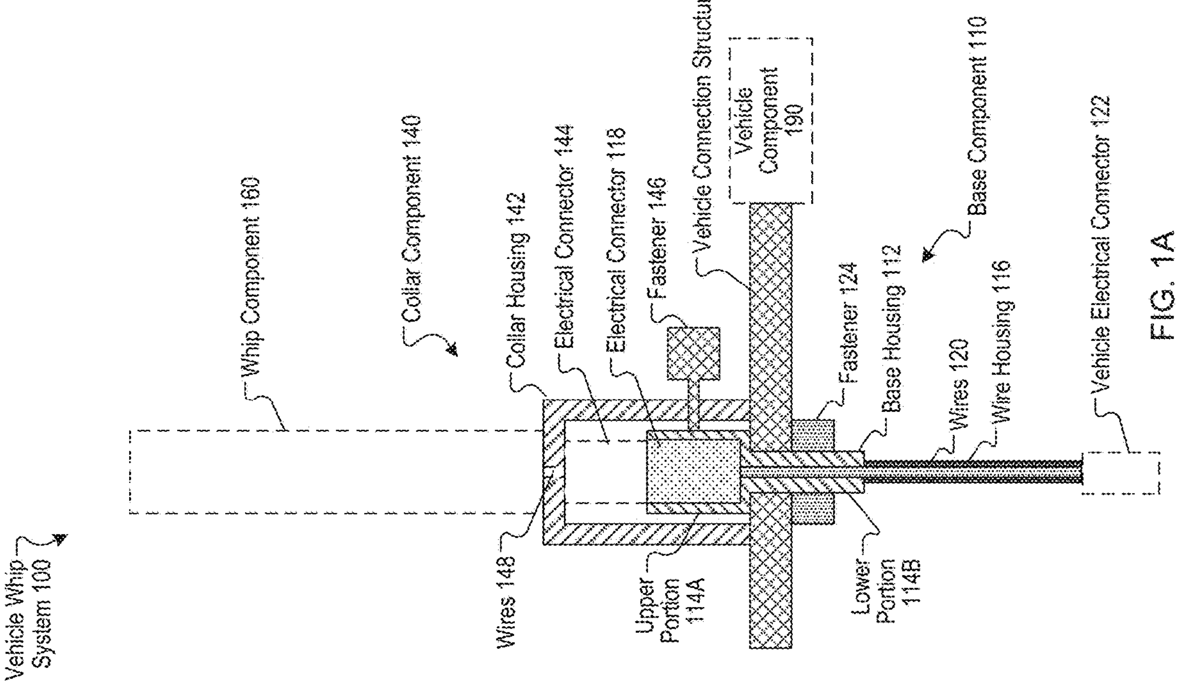
Figures 1C, 1D, 1E, 1F:
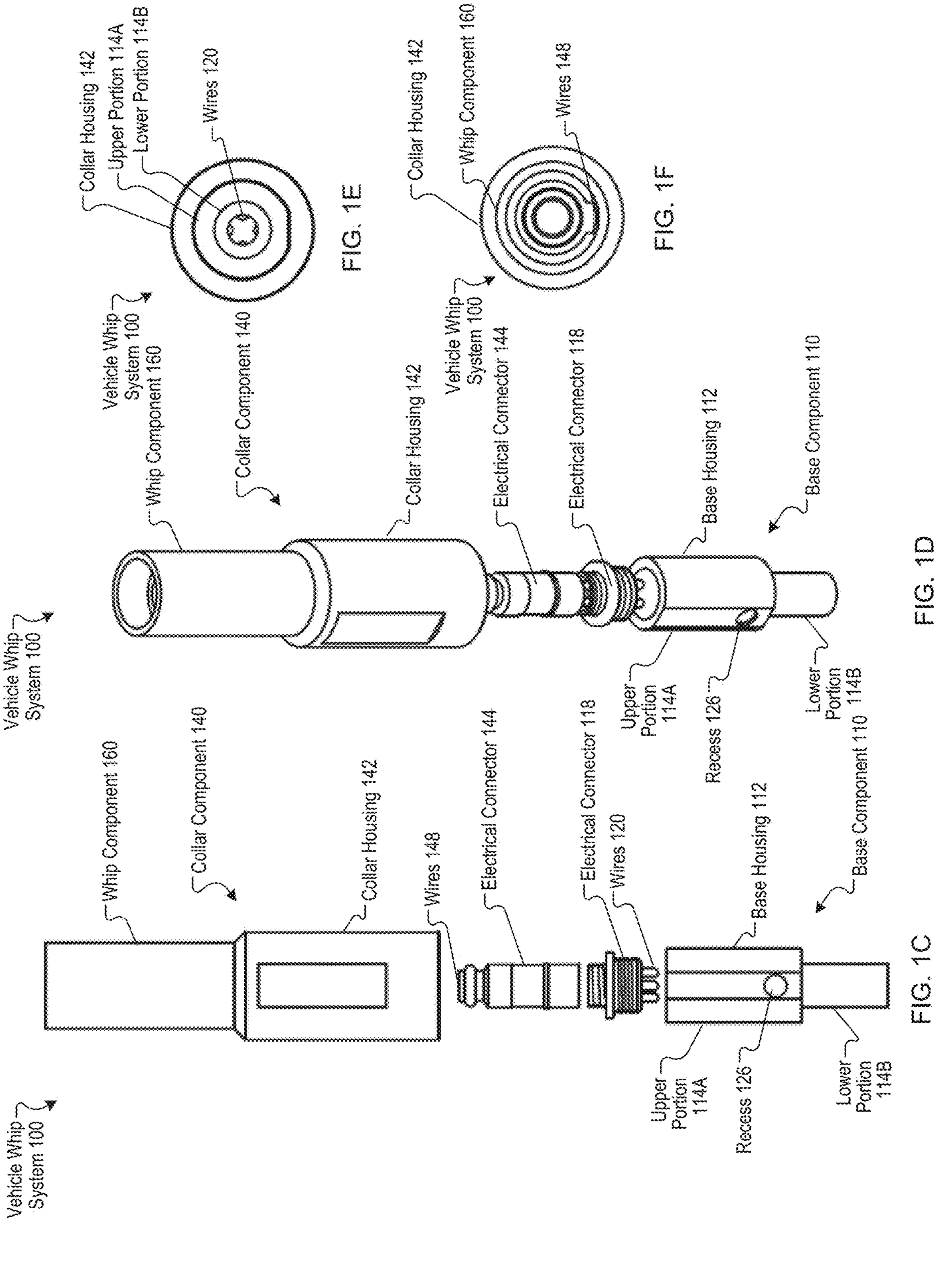
Figure 1G:
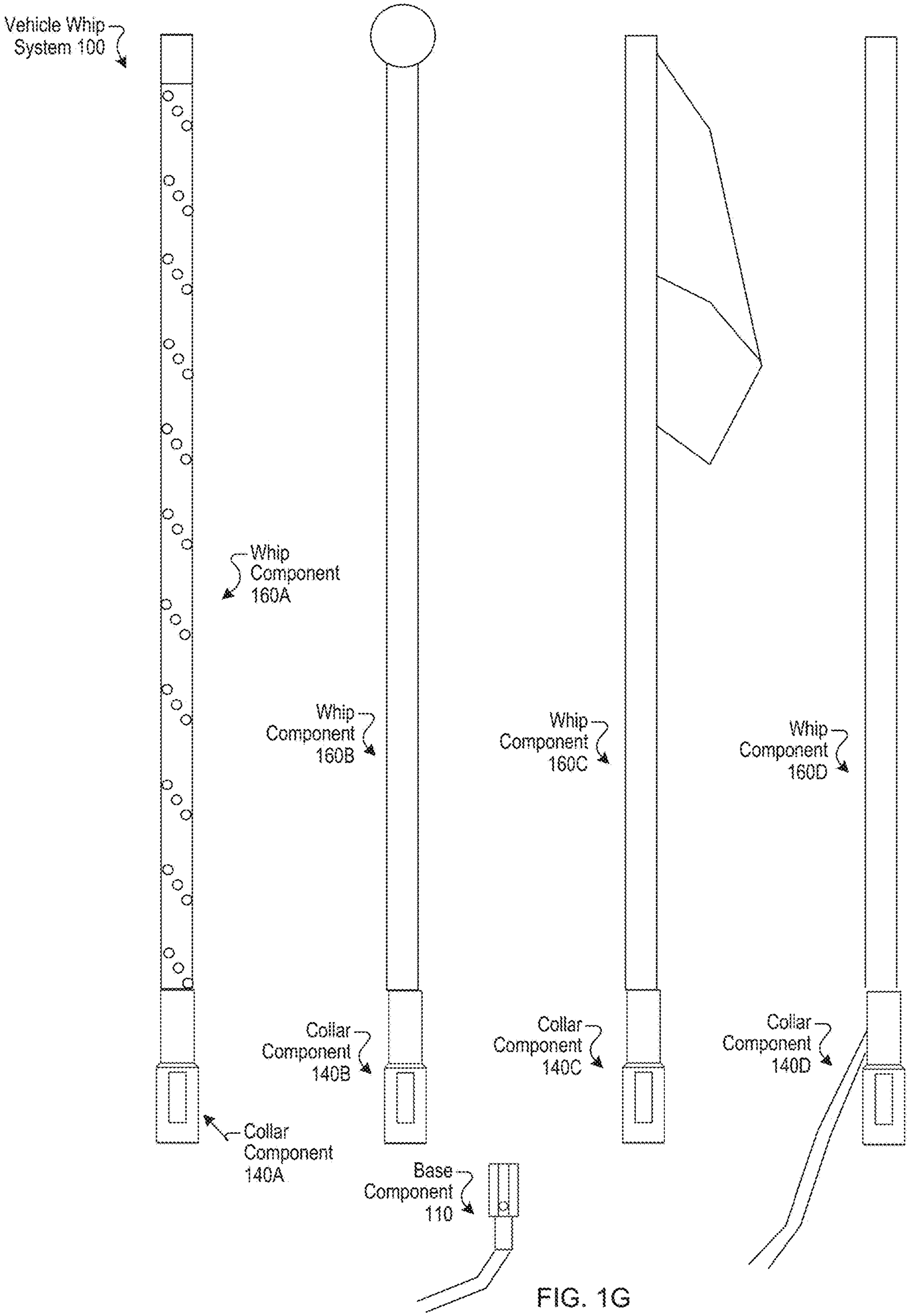

FIGS. 1A-F illustrate views of vehicle whip systems 100, according to certain embodiments. FIG. 1A is a cross-sectional assembled view, FIG. 1B is a cross-sectional exploded view, FIG. 1C is a front exploded view, FIG. 1D is a perspective exploded view, FIG. 1E is a bottom view, FIG. 1F is a top view, and FIG. 1G is a front view.

The vehicle whip system 100 includes a base component 110, a collar component 140, and a whip component 160. The vehicle whip system 100 may include a vehicle connection structure 180.

In some embodiments, a controller of the vehicle whip system 100 is disposed in the base component 110, in the collar component 140, or the whip component 160. In some embodiments, the controller received control signals from the vehicle via vehicle electrical connector 122 and wires 120. In some embodiments, the controller receives control signals wirelessly (e.g., via a wireless component of the vehicle whip system 100 from a user device). In some embodiments, the controller receives control signals (e.g., user input) via a user interface of the vehicle whip system 100. The controller controls (e.g., actuates, changes colors, controls frequency, controls brightness, controls in synchronization with music, etc.) one or more electrical components coupled to whip component 160 (e.g., light emitting diodes, etc.) by transmitting signals via electrical connector 118 to electrical connector 144 to wires 148 to the one or more electrical devices. The controller may be computer system 800 or processing device 802 of FIG. 8.

The base component 110 may include a base housing 112, an upper portion 114A of the base housing 112, a lower portion 114B of the base housing 112, and a wire housing 116 (e.g., flexible wire housing) connected to the lower portion 114B of the base housing 112. An electrical connector 118 may be disposed in the base housing 112 (e.g., in the upper portion 114A of the base housing 112). Wires 120 (e.g., positive, negative, control, and ground wires) may be routed through the base housing 112. The wires 120 may be coupled to the electrical connector 118, may be routed through the lower portion 114B of the base housing 112 and the wire housing 116, and couple to a vehicle electrical connector 122. The vehicle electrical connector 122 may be coupled to a vehicle power source.

In some embodiments, the vehicle electrical connector 122 is configured to connect to a multi-pole electrical connector of a vehicle (e.g., a trailer connector used between a towing vehicle and a trailer). The vehicle may provide power and control signals (e.g., turning signal, brake signal, etc.) via the vehicle electrical connector 122 to control one or more electrical components (e.g., lights) of the vehicle whip system 100. The vehicle electrical connector 122 may be a 7-pin connector (e.g., 7-pin round blade connector (SAE J2863), SAE J560, SAE J560-like type 1, SAE J560-like type 2), 6-pin connector (e.g., 6-pin round connector, 6-pin rectangular connector), 5-pin connector (e.g., flat 5-pin connector, 5-pin round connector), 4-pin connector (e.g., flat 4-pin connector, 4-pin round connector), 3-pin connector (e.g., 3-pin round connector (DIN9680)), etc.

The lower portion 114B of the base housing 112 may be routed through an opening in the vehicle connection structure 180. The upper portion 114A of the base housing 112 may have a larger width than the opening in the vehicle connection structure 180 (e.g., and a larger width than the width of the lower portion 114B of the base housing 112). A fastener 124 (e.g., base fastener) may removably attach to the lower portion 114B of the base housing 112 so that the vehicle connection structure 180 is disposed between the upper portion 114A of the base housing 112 and the fastener 124. In some embodiments, an outer surface of the lower portion 114B of the base housing 112 forms threads and an inner surface of the fastener 124 forms threads so that the fastener 124 threads onto the lower portion 114B of the base housing 112.

In some embodiments, the vehicle connection structure 180 is coupled to a vehicle component 190. In some examples, the vehicle connection structure 180 is a bracket and the vehicle component 190 is a rear-tire mount, where the bracket mounts to the rear-tire mount via two or more of the rear-tire mount bolts. In some examples, the vehicle connection structure 180 is a trailer-hitch adapter and the vehicle component 190 is the trailer hitch, where the trailer-hitch adapter is configured to slide into the trailer hitch and a pin is routed through the trailer hitch and trailer-hitch adapter to secure the trailer hitch and trailer-hitch adapter together. In some examples, the vehicle component 190 is a roll bar and the vehicle connection structure is configured to secure around the roll bar.

In some embodiments, the fastener 124 has inner threads. The fastener 124 may include one or more of a nut, a castle nut, a coupling nut, a flange serrated nut, a hex finish nut, a hex jam nut, a heavy hex nut, a hex machine nut, a keps nut, a k-nut, a washer nut, knurled thumb nut, a nylon hex jam nut, a nylon insert lock nut, a stover nut (e.g., prevailing torque lock nut), a slotted hex nut, a square nut, a structural hex nut, a wing nut, a washer, a retaining ring, etc.

The collar component 140 may include a collar housing 142 that forms an interior volume. An electrical connector 144 may be disposed in the interior volume of the collar housing 142. The interior volume may have a width that is greater than the width of the upper portion 114A of the base housing 112. The collar component 140 may be configured to be disposed on (e.g., disposed around, slid over, receive, etc.) the upper portion 114A of the base housing 112. The collar housing 142 may be slid over the base housing 112 until the collar housing 142 contacts an upper surface of the vehicle connection structure 180 (e.g., lower surface of collar housing 142 is substantially flush with the lower surface of the upper portion 114A). Responsive to the collar component 140 receiving the upper portion 114A of the base housing 112, the electrical connector 144 of the collar component 140 may couple (e.g., electrically couple, physically couple, etc.) with the electrical connector 118 of the base component 110. A fastener 146 (e.g., collar fastener, set screw, thumb screw, pin, magnetic coupling, air chuck base, etc.) may secure the collar housing 142 to the upper portion 114A of the base housing 112. For example, the fastener 146 may be inserted into an opening formed by the collar housing 142 (e.g., threaded into the hole via outer threads of the fastener 146 and inner threads of the opening) and secure against (e.g., provide force on, insert into a slot in) the outer surface of the upper portion 114A of the base housing 112.

In some embodiments, the electrical connector 144 of the collar component 140 is a female base component (e.g., in-line female connector) and the electrical connector 118 of the base component 110 is a male base component (e.g., male chassis socket). The base component 110 houses wires 120 (e.g., first interior control wires) and collar component 140 that houses wires 148 (e.g., second interior control wires), where the collar component 140 is configured to attach to the base component 110 to electrically couple the wires 120 with the wires 148.

In some embodiments, a protective closure component (e.g., cap, screw-on cap) is configured to attach to the base component 110 (e.g., to cover electrical connector 118) when the collar component 140 is not attached to the base component 110. In some embodiments, the protective closure component prevents particles and/or moisture from entering the electrical connector 118 (e.g., protective cap provides a seal). In some embodiments, the screw-on cap is coupled to the vehicle whip system 100 (e.g., base housing) (e.g., via chain with eyelet clip for screw mounting).

The whip component 160 may be coupled to (e.g., attached to, connected to, welded to, secured to, integral to, removably attached to, permanently attached to, etc.) the collar housing 142. In some embodiments, wires 148 are routed from the electrical connector 144 disposed in the collar housing 142 to one or more electrical devices of the whip component 160. In some embodiments, the whip component 160 includes a whip structure (e.g., cylindrical structure, pole, a rod, a tube, an antenna, and/or the like). The whip component 160 may include an object (e.g., flag, light, etc.) attached to the whip structure. The whip component 160 may include an object (e.g., lights, controller, etc.) disposed within the whip structure. The whip component 160 may include a whip structure (e.g., cylinder, tube, etc.) that may be made of fiberglass, plastic, metal, wood, etc.

Referring to FIGS. 1A-B, the vehicle electrical connector 122, wire housing 116, and at least a portion of lower portion 114B of the base housing 112 may be routed through an opening of a vehicle connection structure 180 that is configured to connect to a vehicle component 190. Fastener 124 may be threaded onto the lower portion 114B of the base housing 112 that is below the vehicle connection structure 180 to secure the base component 110 to the vehicle connection structure 180. Collar housing 142 may be disposed over the upper portion 114A of the base housing 112 and fastener 146 may threaded into an opening in the collar housing 142 until it contacts the upper portion 114A of the base housing 112. To switch the collar component 140 (e.g., connected to a corresponding whip component 160), the fastener 146 may be unthreaded from the opening and a new collar component 140 (e.g., connected to a corresponding whip component 160) may be disposed on the upper portion 114A of the base housing 112 and a fastener 146 may be used to secure the new collar component 140 to the base housing 112 (e.g., without disconnecting the vehicle electrical connector 122 from the vehicle wiring, without removing the vehicle connection structure 180 from the vehicle component 190, and without removing the base component 110 from the vehicle connection structure 180).

Referring to FIGS. 1C-D, in some embodiments, the base housing 112 forms a recess 126 to receive the fastener 146 that secures the collar housing 142 to the upper portion 114A of the base housing 112. The fastener 146 may be a set screw, a thumb screw, a bolt, etc.

Referring to FIG. 1C-F, in some embodiments, the electrical connector 144 of the collar component 140 is a female pin connector (e.g., 4-pin or 7-pin) and the wires 148 are connected to the electrical connector 144 include a wiring harness attachment (e.g., through the collar housing 142 to the whip component 160). The collar component 140 and/or whip component 160 may form an upper wiring harness slot for the wires 148. In some embodiments, the electrical connector 118 of the base component 110 is a male pin connector (e.g., 4-pin or 7-pin) and wires 120 are connected to the electrical connector 118 via a wiring harness attachment (e.g., through base housing 112).

Referring to FIG. 1G, in some embodiments, the base component 110 is configured to receive different collar components 140 coupled (e.g., integral, secured, etc.) to a corresponding whip component 160.

In some embodiments, a whip component 160A may have multiple lights (e.g., light emitting diodes (LEDs)) disposed in the whip structure or secured to the whip structure.

In some embodiments, a whip component 160B has a light device disposed at an upper distal end of the whip structure (e.g., fiberglass rod with light on top).

In some embodiments, a whip component 160C has a flag secured to the whip structure.

In some embodiments, collar components 140A-C that couple to the base component 110 do not have external wires (e.g., the vehicle whip system 100 does not have external wires above the lower portion of the base housing 112). In some embodiments, collar component 140D has one or more external wires (e.g., to connect to a vehicle power source).

In some embodiments, the materials to produce a vehicle whip system 100 (e.g., LED flag whip base assembly) may include one or more of the following:

Polycarbonate Tube 4' cut to 46" with a 1⁄16" wall, 6' cut to 70" with a 1⁄8" wall (e.g., to form whip component 160);
Ribbon product series 1500 (Single) 2500 (RGB) 3500 (Chasing) (e.g., to form whip component 160);
Clear heat-shrink (size 1") (e.g., to form whip component 160);
Top Cap (e.g., to form whip component 160);
Collar (e.g., collar housing 142);
9' of 4 conductor wire with jumper;
4 conductor wire;
Glue #5405 clear or black;
Female connector (e.g., electrical connector 144);
Male connector (e.g., electrical connector 118);
Thumb Key (e.g., fastener 146);
Dust Cap (screw on);
Mounts;
52" Internal wire for 4' RGB and Chasing;
76" Internal wire for 6' RGB and Chasing;
(e.g., use 2 conductor for chasing and single whips, 4 conductor for RGB whips); and/or
Glue #55420.

Preparation of a whip component 160 (e.g., rod component) of the vehicle whip system 100 may include one or more of:

1. Using rod template, mark the rod 1" from end of rod for inside drill and 1½ inches from end of rod for wire hole.
2. Place cap on rod and mark (the ribbon will end at the top of mark under the cap).
3. Using drill 35⁄64", drill out the inside of the tube to the line with the Lathe.
4. Drill out the wire hole at mark. Clean off excess plastic and set aside.

Preparation of a collar component 140 (e.g., female base component) may include one or more of:

1. Cut off the base ring.
2. Take apart female connector (4 pieces).
3. Flux and solder the all wire base prongs #1, #2, #3 and #4.
4. Cut 4" of the 4-conductor wire. Strip off jacket and tin ¼" at end of each wire.
5. Solder 4" wires to the Female wire base prongs using the template below.
6. Visually inspect that all wires are soldered correctly.
7. Once wires are soldered on the base re-assemble the controller. (Secure lock pin before screwing together)
8. Using #55420, fill the inside of the base about ¼ full to secure wiring. Set aside to dry. (Remove side screws once glue is dry, place them in a bag to be sent back to vendor)
9. Using sander, sand down screw corners so the points are rounded. See Preparation of base component 110 (e.g., male base component) may include one or more of:

1. Remove rings from the male connector.
2. Snip off the end connectors of the 9' wire.
3. Push the 9' wire up through the base and out the top.
4. Solder the wires to the male connector.
5. Visually inspect that all wires are soldered correctly.
6. Use a small amount of Loctite to secure male connector to 9' wire base.
7. Screw on male connector to base so it is flush. Note: use pliers and Lathe if needed to get flushed to connector and indexed.
8. Test with Template, key pin should match up with connector pin, so it is flush and slides on and off easily. Line up connector pin to template pin example. If not flush and easily installed turn male connector slightly to readjust until it fits flush with test collar.
9. Once tested glue hole with #5405 black and let dry.

Preparation of the vehicle whip system 100 may include one or more of:

1. Push electrical connector 144 (e.g., female connector) and wires 148 into collar component 140 and/or whip component 160 (e.g., rod) and thread a first portion of the wires 148 (e.g., shorter wires) out the opening (e.g., drill hole) formed in the whip component 160. Maintain the wires straight. A second portion of the wires 148 (e.g., internal wires) run inside the whip component 160 (e.g., rod) and out the other side (e.g., distal end).
2. Push the index tool over the whip component 160 (e.g., rod) and wires 148, using index tool attached to table, slide on whip component 160 (e.g., rod) maintaining the wires 148 even with flat area. Insert whip component 160 (e.g., rod) onto table index tool (electrical connector 144 and Index tool are to be lined up with pin), slide index tool over table index tool (e.g., this is to slide over whip component 160 easily so that lining up is accurate).
3. Glue using #5405 clear lightly coat the inside surface of the whip component 160. Insert electrical connector 144 (e.g., female connector) inside whip component 160 up to rim ring, and re-center with table tool to provide an accurate line up.
4. Test the electrical connector 118 (e.g., male connector) fits by lining up all flat parts with wire, push connector flush with index tool.

5. Remove index tool.
6. Assemble the whip component 160 (e.g., rod), collar component 140, and base component (e.g., male base). Line up so wires are even with flat cut out and notched out groove. Grooves are to be lined up straight.
7. Make a mark at the end of the collar component 140 where the ribbon (e.g., ribbon of LED lights) is to start. A lower surface of the collar component 140 is to be flush with a lower surface of the upper portion 114A and easy to slide on and off of the upper portion 114A. Remove collar component 140 from the upper portion 114A.

A wrapping ribbon of LED lights may be coupled to (e.g., be part of) the whip component 160. The soldering and wrapping of ribbons (e.g., coupling of the wrapping ribbon to the whip component 160) may include one or more of:

Note: base wires may not be cut, excess wires may be pushed inside whip component 160 (e.g., rod).

1. Lay the ribbon flat and solder the wires to the ribbon using the template. Push all excess wire into whip component 160 (e.g., rod) so that wires are straight and not twisted.

The ribbon template may be as follows:

RGB 2500
Wire/Ribbon
Red=+
Black=R
White=G
Blue=B
Chasing 3500
Wire/Ribbon
Red=12V
Black=GRD
Blue=Data
White wire is connect to Black wire 2. Test Ribbon with the correct tester. (turn off tester before connecting to wires to avoid burning out tester)
3. Place collar component 140 over whip component 160 (e.g., rod) and wires and cut off excess rubber from solder to 1$^{st}$ LED so all trimmed areas fit under collar component 140 (e.g., collar housing 142).
4. Start wrapping the ribbon at the bottom of the mark. See Note: the ribbon arrows are to go towards the top of the rod.

5. End the ribbon at top of rod mark, put wires threw notch and solder internal wires to ribbon.
6. Test ribbon
7. Use glue #5405 black or clear, spread glue over the outside of tube and slide the base onto the whip component 160 (e.g., rod) so that the ribbon is in the notched-out area of the base. (Wires are to be straight)
8. Slide collar component 140 onto whip component 160 (e.g., rod) and insert base component 110 into the collar component 140 to align. Remove base component 110 (try several base components 110 to ensure a good fit) leave base component 110 in until dry.
9. Once collar component 140 is glued and dried in place, use glue #5405 black to cover exposed wires and whip component 160 (e.g., rod).

In some embodiments, one or more portions of the vehicle whip system 100 may be heat shrunk. The use of heat shrink (e.g., heat shrinking at least a portion of the vehicle whip system 100) may include one or more of:

1. Cut heat shrink 4" longer than whip component 160 (e.g., rod). Roll out the 1" clear heat shrink and slide over ribbon and up onto collar component 140. (air hose may be used to help slide heat shrink over ribbon)
2. Heat shrink by hand starting at the collar component 140 to keep heat shrink at the taper, once heat shrink is on collar component 140, you can now place into oven. Or use hand heat gun to shrink the heat shrink. Run the whip components 160 through the oven at setting 3 between the oven tracks. (No more than 3 whip components 160 at a time). (Collar component 140 may not fit under heat plate so the heat plate may be lifted up so the collar component 140 fits through oven).
3. Once heat shrink is on whip component 160 (e.g., rod), cut off excess heat shrink from top of whip component 160 (e.g., rod). Glue on cap with glue #5405 black or clear.
4. Final Testing will be done on the test module for 24 hrs A label may be coupled to the collar component 140 by performing one or more of:

1. Place label squarely in center of collar notch.
2. Use liquid lens to dome label, sweeping side to side touching end of label, once liquid lens settles, use a pick tool to smooth to corners of label if needed.
3. Hand torch every to eliminate the air bubbles.
4. Liquid lens is to have a smooth dome over label without over filling.
5. Once dry, inspect label for bubbles (may have to replace label if fails bubble inspection).

A product kit of the vehicle whip system 100 may include one or more of:

2, 4' or 6' chasing whips (e.g., collar component 140 secured to whip component 160)
2, male 9' base components 110 (e.g., including wire housing 116 and vehicle electrical connector 122) with gaskets
2, washers (e.g., to be used with fastener 124)
2, Nuts (e.g., fastener 124)
1, 2 output controller (e.g., to couple to base components 110 for controlling electrical devices of whip components 160)
2, key locks (e.g., fasteners 146)
2, screw caps (e.g., to be used with fasteners 146)
2, flags (e.g., to be attached to whip component 160)
2, zip ties (e.g., to secure wire housing 116 to vehicle connection structure 180 and/or to the vehicle)
1, Instruction Manuel In some embodiments, the vehicle whip system 100 (e.g., LED flag whip base assembly) has interior control wires (e.g., no exterior control wires, no wires coupled to an outer surface of the collar component 140, whip component 160, and/or base component 110). The vehicle whip system 100 (e.g., LED flag whip base assembly) may provide for electrical components (e.g., interior control wires, etc.) to be fully contained in the quick release mounting assemble (base component 110 and collar component 140). Conventional whips may include exterior control wires (e.g., wiring, cabling, electrical wires, dongle, exposed control wires, etc.) that may be easily snagged on objects (e.g., brush, trees, etc.) causing damage and breakage to whips.

Figures 2A, 2B, 2C, 2D:
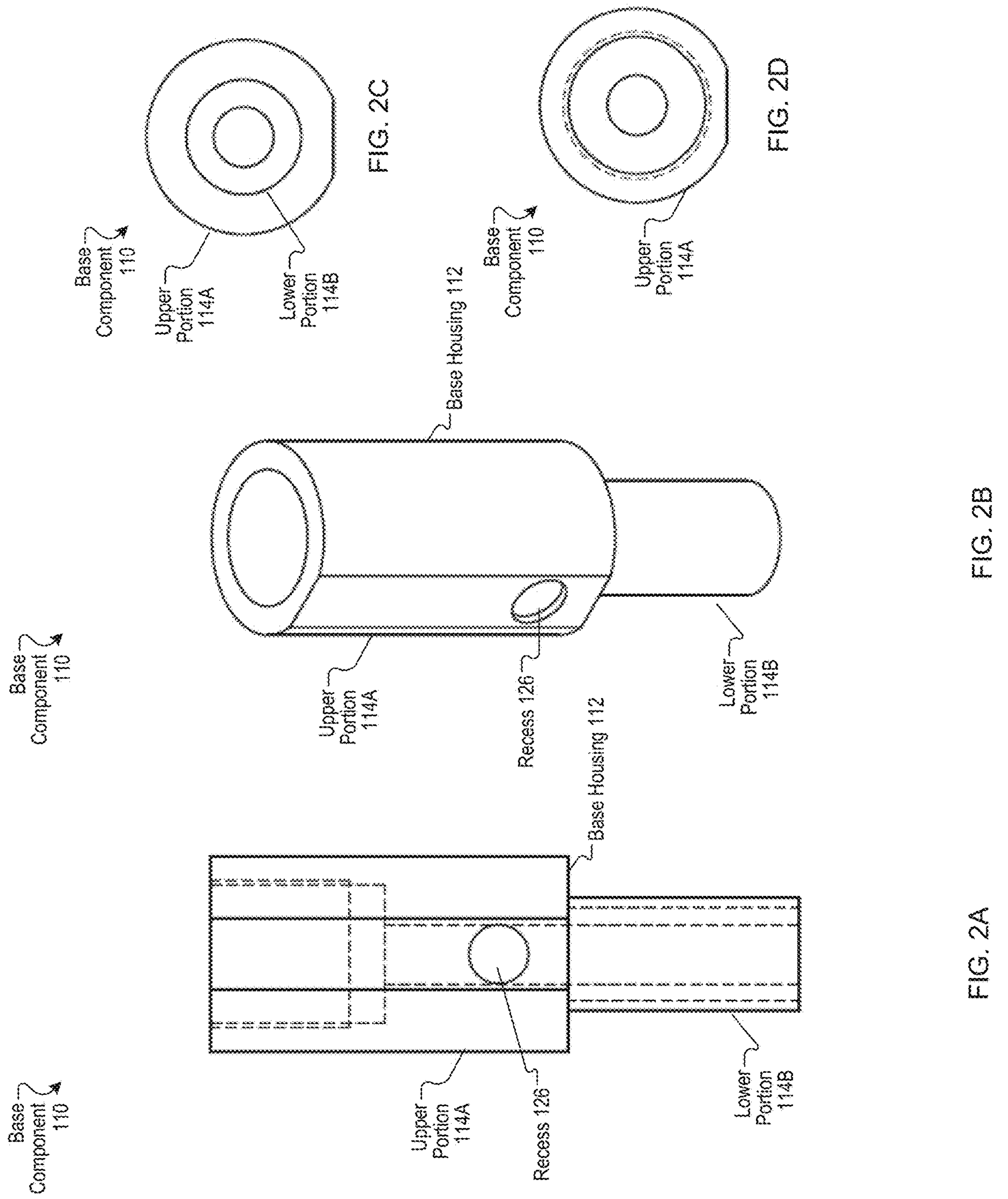
FIGS. 2A-D illustrate views of base components of vehicle whip systems, according to certain embodiments.

FIGS. 2A-D illustrate views of base components 110 of vehicle whip systems 100, according to certain embodiments. FIG. 2A is a front view, FIG. 2B is a perspective view, FIG. 2C is a bottom view, and FIG. 2D is a top view.

Base component 110 has a base housing 112 that includes an upper portion 114A configured to house an electrical connector 118 and a lower portion 114B configured to house wires 120 coupled to the electrical connector 118. The base housing 112 may form a recess 126 to receive a fastener 146.

Figures 3A, 3B, 3C, 3D, 3E:
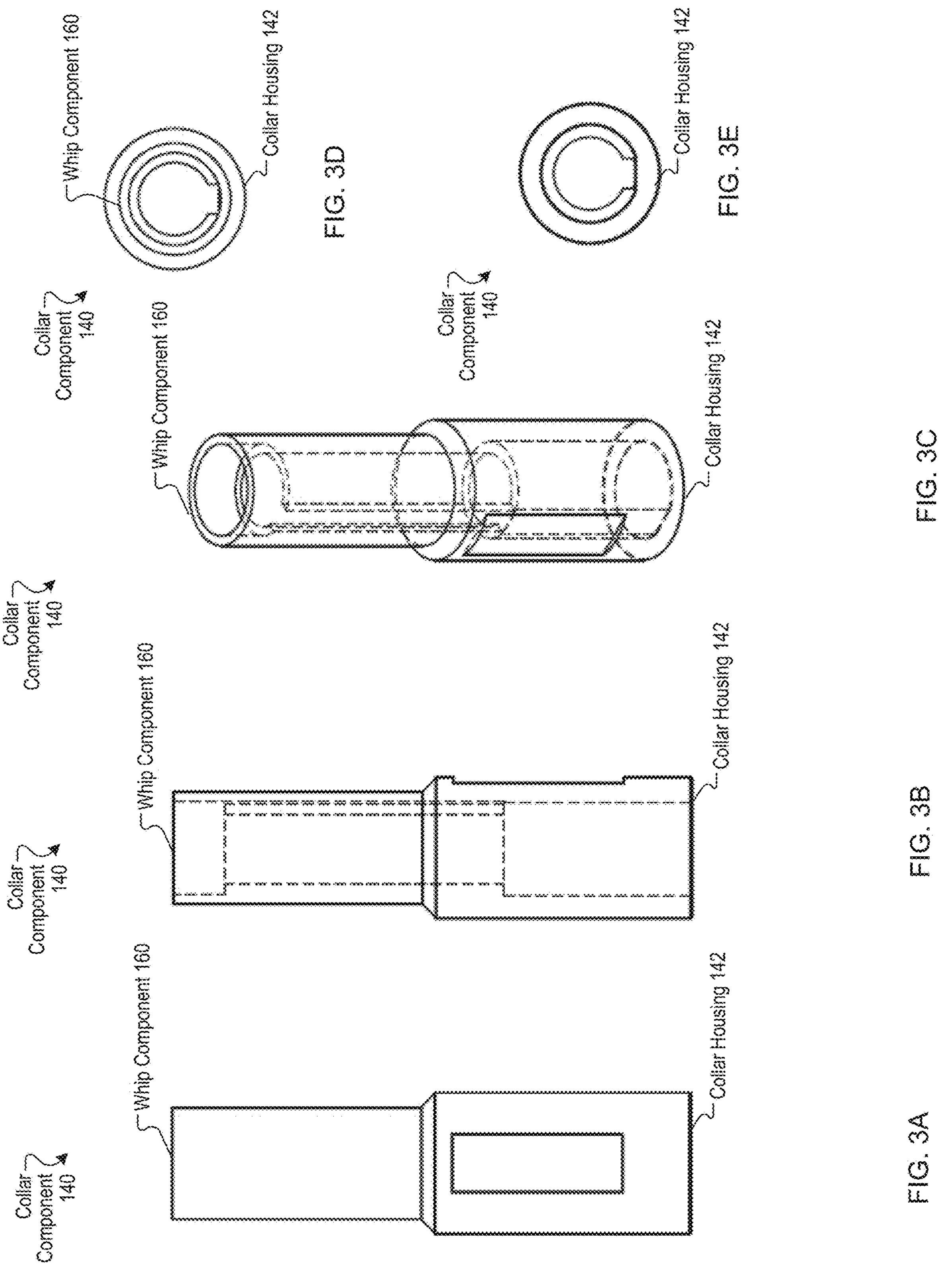
FIGS. 3A-E illustrate views of collar components of vehicle whip systems, according to certain embodiments.

FIGS. 3A-E illustrate views of collar components 140 of vehicle whip systems 100, according to certain embodiments. FIG. 3A is a front review, FIG. 3B is a side view, FIG. 3C is a perspective view, FIG. 3D is a bottom view, and FIG. 3E is a top view.

Collar component 140 may have a collar housing 142 that is coupled to (e.g., integral to) a whip component 160. In some embodiments, a whip structure (e.g., whip, rod, tube, etc.) is coupled to the whip component 160.

Figures 4A, 4B, 4C, 4D, 4E, 4F:
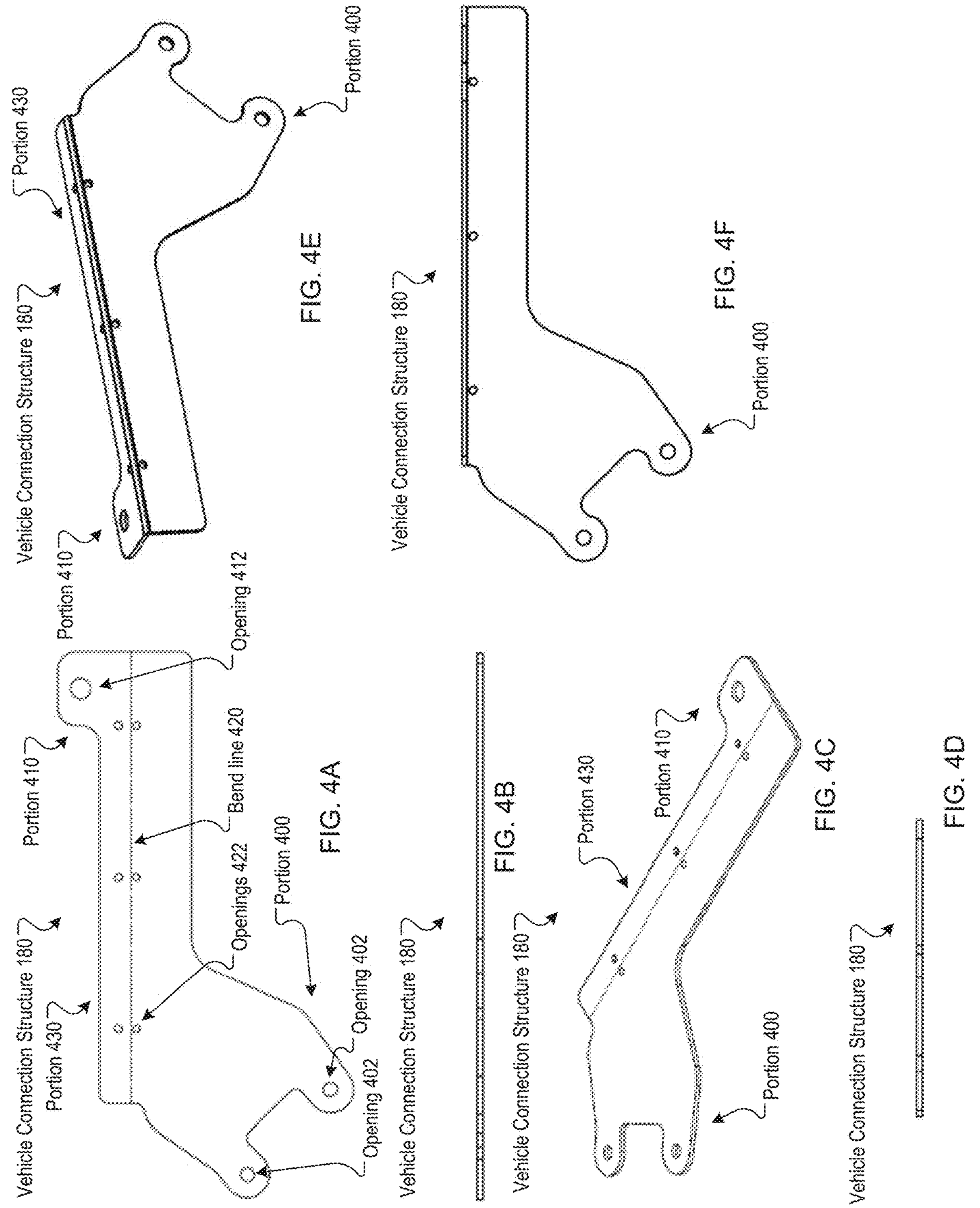
FIGS. 4A-G illustrate views of vehicle connection structures, according to certain embodiments.
Figure 4G:
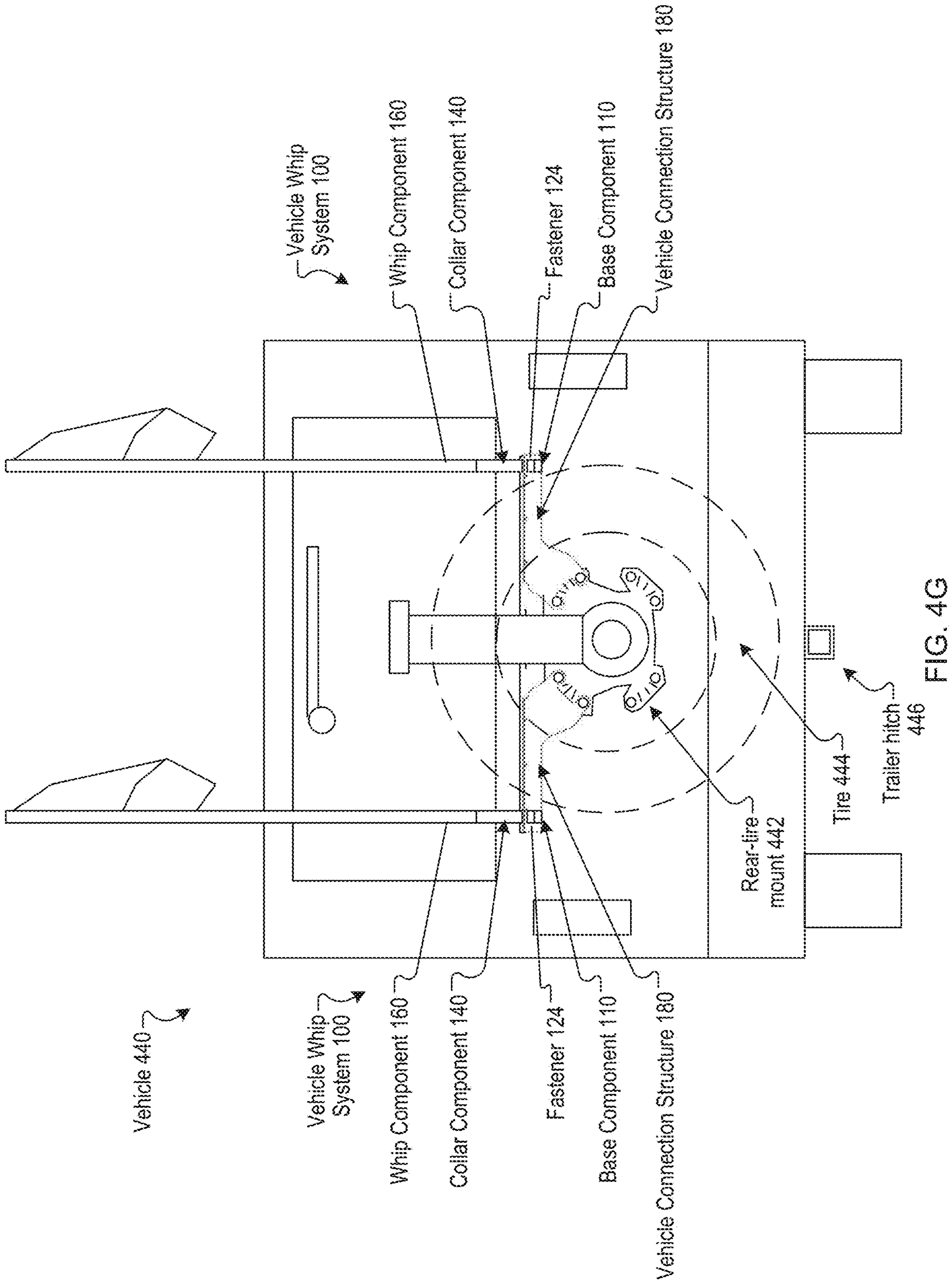

FIGS. 4A-G illustrate views of vehicle connection structures 180, according to certain embodiments. FIG. 4A is an un-bent top view, FIG. 4B is an un-bent side view, FIG. 4C is an un-bent perspective view, FIG. 4D is an un-bent side view, FIG. 4E is a bent perspective view, FIG. 4F is a bent front view, and FIG. 4G is a bent front view.

The vehicle connection structure 180 may be a bracket that has a portion 400 (e.g., configured to be oriented in a substantially vertical configuration) forming one or more openings 402 to be connected to a rear-tire mount of a vehicle via mounting bolts of the rear-tire mount. The bracket may have a portion 410 (e.g., configured to be oriented in a substantially horizontal configuration) forming an opening 412. The lower portion 114B of the base housing 112 may be routed through the opening 412. The vehicle connection structure 180 may be bent along a bend line 420 so that the portion 400 is in a substantially vertical configuration and the portion 410 is in a substantially horizontal configuration. In some embodiments, the wire housing 116 is secured to the vehicle connection structure 180 via fasteners (e.g., zip ties) that go through openings 422 and around the wire housing 116.

In some embodiments, the bend line 420 causes portion 430 and portion 410 to be oriented in a substantially horizontal configuration. The portion 430 may extend a shorter distance from the bend line 420 than portion 410 to allow clearance for a tire mounted to the rear-tire mount while still providing strength to portion 410 to prevent deflection of the portion 410 from the substantially horizontal configuration.

Referring to FIG. 4G, the vehicle connection structures 180 may be mounted to a rear-tire mount 442 of a vehicle 440 and a tire 444 may be mounted to the rear-tire mount 442. The base component 110 may be partially routed through openings 412 of the portions 410 of the vehicle connection structures 180. A collar component 140 may be coupled to (e.g., removably secured to) the base component 110. A whip component 160 may be coupled to (e.g., integral to) the collar component 140. The location of the vehicle connection structures 180 may allow the objects (e.g., flags, lights) connected to the whip component 160 to be located at a higher distance from the ground and may protect the vehicle whip systems 100 from foreign objects (e.g., vegetation, etc.).

FIG. 4G illustrates vehicle connection structures 180 (e.g., vehicle whip brackets) coupled to a vehicle 440, according to certain embodiments. The vehicle 440 may have a rear-tire mount 442 (e.g., rear-tire housing). The rear-tire mount 442 may be configured to secure a tire 444 in a substantially vertical position. The tire 444 may be a spare tire. The rear-tire mount 442 may be behind the cab (e.g., location where the driver sits) of the vehicle 440. The rear-tire mount 442 may be at the end of the vehicle 440. The rear-tire mount 442 may be located above the axles of the vehicle 440. The rear-tire mount may have a plurality of fasteners (e.g., bolts, nuts) securing the rear-tire mount 442 to a vertical surface of the vehicle 440. The rear-tire mount may have groups of two of more fasteners.

The vehicle connection structure 180 (e.g., vehicle whip bracket) may include a portion 400 (e.g., forming two or more openings 402) that connects via one or more fasteners of the rear-tire mount 442 to the rear-tire mount 442. In some embodiments, each vehicle connection structure 180 (e.g., vehicle whip bracket) may be secured to the rear-tire mount 442 via two or more fasteners (e.g., a group of two bolts, a group of two nuts) of the rear-tire mount 442 (e.g., the two or more fasteners pass through the two or more openings). In some embodiments, the vehicle connection structure 180 (e.g., vehicle whip bracket) has a portion 410 that is configured to secure a whip component 160 (e.g., in a substantially vertical position). The portion 410 may form an opening and the base component 110 may secure to the portion 410 via the opening.

Responsive to the portion 410 of the vehicle connection structure 180 (e.g., vehicle whip bracket) being secured to the rear-tire mount 442, the portion 410 of the vehicle connection structure 180 (e.g., vehicle whip bracket) may be in a substantially horizontal position.

In some embodiments, two or more vehicle connection structures 180 (e.g., vehicle whip brackets) may be secured to the rear-tire mount 442. For example, a first vehicle connection structure 180 (e.g., vehicle whip bracket) may be secured to the rear-tire mount 442 via a first group of fasteners and a second vehicle connection structure 180 (e.g., vehicle whip bracket) may be secured to the rear-tire mount 442 via a second group of fasteners. The first vehicle connection structure 180 (e.g., vehicle whip bracket) may extend a first direction away from the rear-tire mount 442 to secure a first whip component 160 a first distance in the first direction away from the rear-tire mount 442 and the second vehicle connection structure 180 (e.g., vehicle whip bracket) may extend a second direction (e.g., opposite the first direction) away from the rear-tire mount 442 to secure a second whip component 160 a second distance (e.g., the second distance may be substantially the same as the first distance) in the second direction away from the rear-tire mount 442.

The vehicle 440 may have a rear window (e.g., a rear window of the cab). The portion 410 of the vehicle connection structure 180 (e.g., vehicle whip bracket) may be located proximate (e.g., below) the rear window.

The vehicle connection structure 180 (e.g., vehicle whip bracket) may locate the whip component 160 at a location (e.g., above the ground, above the axles, above the bumpers, proximate the rear window) to improve visibility of the whip component 160 and to avoid damage of the vehicle whip system 100 from foreign objects.

In some embodiments, a tire 444 may be secured to the rear-tire mount 442. Responsive to the portion 400 of the vehicle connection structure 180 (e.g., vehicle whip bracket) being secured to the rear-tire mount 442 and a tire 444 being secured to the rear-tire mount 442, the portion 410 of the vehicle connection structure 180 (e.g., vehicle whip bracket) may be configured to secure a base component 110 at a location that is not blocked by the tire mounted to the rear-tire mount. The base component 110, collar component 140, and whip component 160 may be secured to and unsecured from the vehicle connection structure 180 (e.g., vehicle whip bracket) without removing the tire 444 from the rear-tire mount 442. A first vehicle connection structure 180 (e.g., vehicle whip bracket) may secure a first base component 110 proximate a first location on the perimeter of the tire 444 mounted to the rear-tire mount and the second vehicle connection structure 180 (e.g., vehicle whip bracket) may secure the second base component 110 proximate a second location on the perimeter of the tire 444 mounted to the rear-tire mount 442. The first and the second locations on the perimeter of the tire may be substantially in the same plane (e.g., a horizontal plane).

The portion 400 of the vehicle connection structure 180 (e.g., vehicle whip bracket) (e.g., forming one or more openings 402 to be secured by one or more fasteners to the rear-tire mount 442) is in a first plane and the portion 410 of the vehicle connection structure 180 (e.g., vehicle whip bracket) (e.g., forming an opening 412 to secure a base component 110 in a substantially vertical position). The first plane and the second plane may be substantially perpendicular to each other. In some embodiments, the vehicle connection structure 180 (e.g., vehicle whip bracket) may initially be planar (e.g., laser cut from a planar sheet of metal). The vehicle whip bracket may be bent or folded so that the portion 400 is substantially perpendicular to the portion 410. In some embodiments, the vehicle connection structure 180 (e.g., vehicle whip bracket) initially has the portion 400 and the portion 410 that are substantially perpendicular to each other (e.g., via injection molding, casting, etc.).

In some embodiments, the vehicle connection structure 180 (e.g., vehicle whip bracket) is formed by laser cutting metal (e.g., laser cutting the perimeter) and then bending the laser cut metal. In some embodiments, the openings in the vehicle connection structure 180 (e.g., vehicle whip bracket) are formed by laser cutting. In some embodiments, the openings are formed by a process (e.g., cutting, punching, etc.) separate from the laser cutting of the perimeter of the vehicle connection structure 180 (e.g., vehicle whip bracket)).

In some embodiments, the metal is anodized prior to laser cutting. In some embodiments, the cut metal is anodized prior to the bending. In some embodiments, the bent cut metal is anodized after the bending. In some embodiments, the vehicle connection structure 180 (e.g., vehicle whip bracket) is anodized subsequent to forming the openings in the vehicle connection structure 180 (e.g., vehicle whip bracket).

In some embodiments, one or more openings formed by the vehicle connection structure 180 (e.g., vehicle whip bracket) may be substantially the same size and form (e.g., round) as corresponding fasteners. In some embodiments, one or more openings formed by the vehicle connection structure 180 (e.g., vehicle whip bracket) may have a larger size than and substantially the same form (e.g., round) as the corresponding fasteners. In some embodiments, the one or more openings formed by the vehicle connection structure 180 (e.g., vehicle whip bracket) are slots (e.g., a different form than the fasteners, substantially the same size as the fastener in a first direct and a larger size as the fastener in a second direction).

The vehicle connection structure 180 (e.g., vehicle whip bracket) may have additional openings. In some embodiments, each of a first set of openings (e.g., three openings) in the portion 400 of the vehicle connection structure 180 (e.g., vehicle whip bracket) are proximate a corresponding opening of a second set of openings (e.g., three openings) in the portion 410 and/or portion 430 of the vehicle whip bracket that is substantially perpendicular to the portion 400. One or more of the additional openings may receive a corresponding fastener (e.g., to mount to the vehicle, a zip tie to secure the wire housing of the base component 110, etc.).

The vehicle connection structure 180 (e.g., vehicle whip bracket) may be made of 5052 aluminum with an anodized finish. The vehicle connection structure 180 (e.g., vehicle whip bracket) may have a thickness of about 0.125 inches.

The vehicle connection structure 180 (e.g., vehicle whip bracket) may receive a base component 110. Although portions of the present disclosure refer to an LED flag whip, the vehicle connection structure 180 (e.g., vehicle whip bracket) may be used to secure other objects (e.g., flag whips, whips, poles, etc.) that are not an LED flag whip. Although portions of the present disclosure refer to an LED flag whip base assembly, the base component may be used for other objects other than an LED flag whip.

Figures 5A, 5B, 5C, 5D:
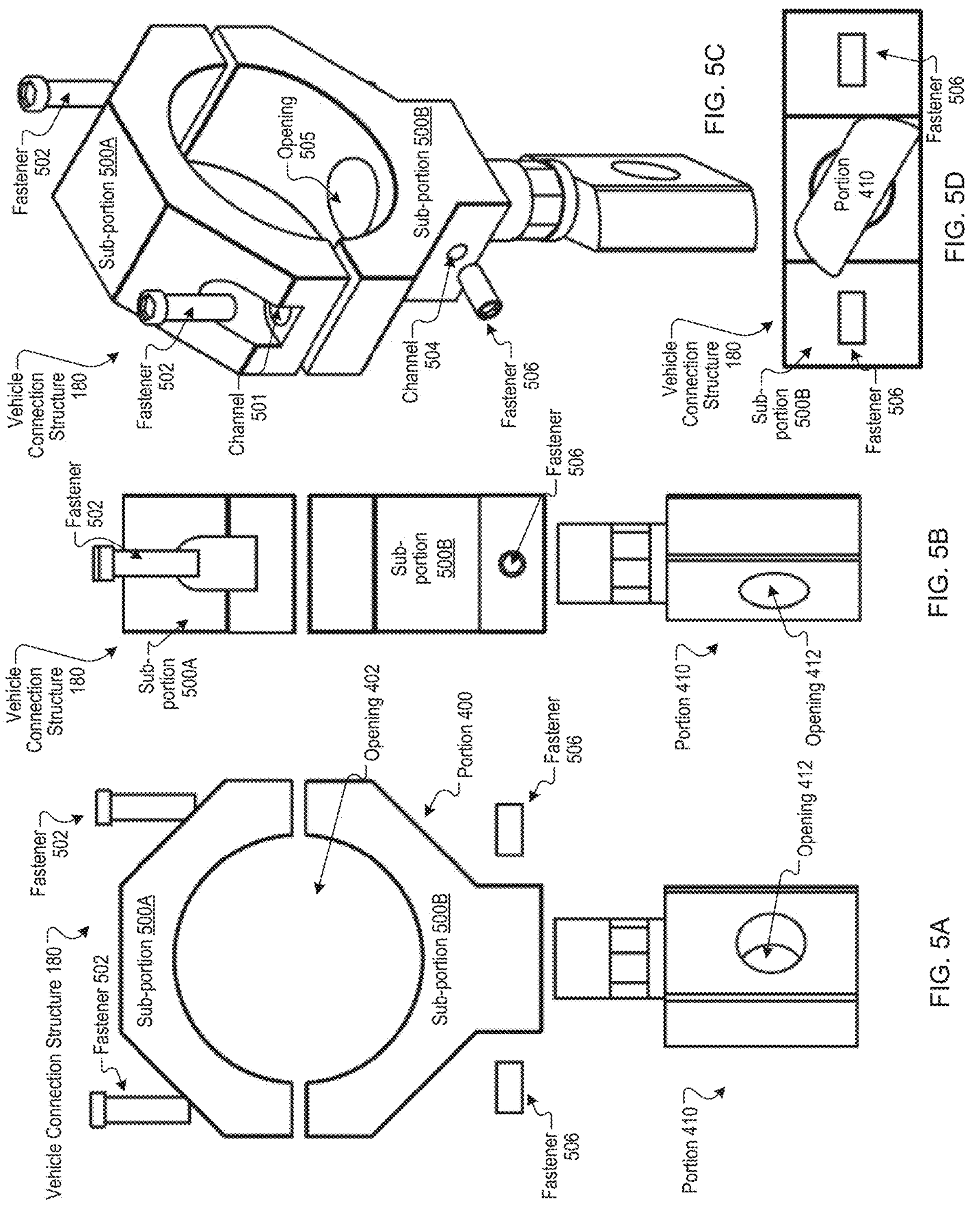
FIGS. 5A-F illustrate views of vehicle connection structures, according to certain embodiments.
Figure 5F:
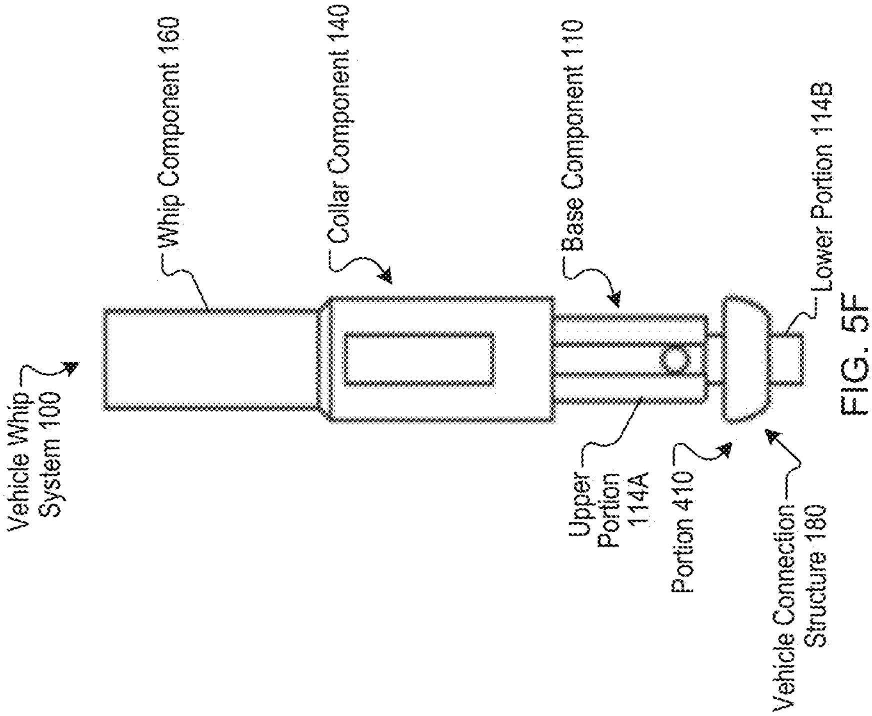
Figure 5E:
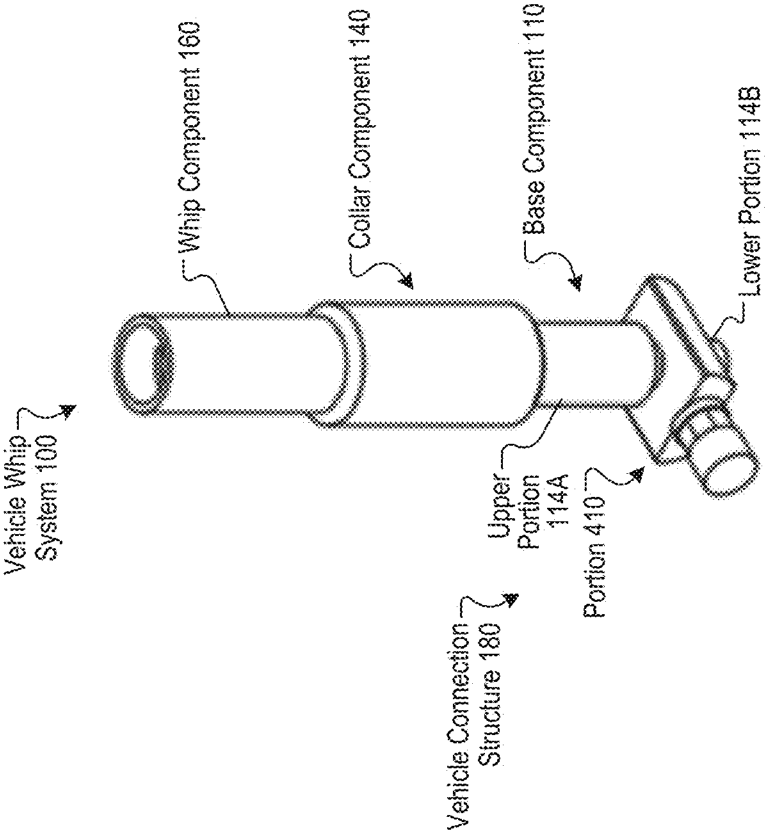

FIGS. 5A-F illustrate views of vehicle connection structures 180, according to certain embodiments. FIG. 5A is a front exploded view, FIG. 5B is a side exploded view, FIG. 5C is a perspective exploded view, and FIG. 5D is a bottom view. FIG. 5E is a perspective view of a vehicle whip system 100 coupled to portion 410 of the vehicle connection structure 180 and FIG. 5F is a side view of a vehicle whip system 100 coupled to portion 410 of the vehicle connection structure 180.

In some embodiments, vehicle connection structure 180 is configured to secure to a roll bar of a vehicle. A portion 400 of the vehicle connection structure 180 forms an opening 402 to secure to the roll bar and a portion 410 of the vehicle connection structure 180 forms an opening to receive a lower portion 114B of base housing 112. The portion 400 may include sub-portions 500A-B that are removably attached to each other via fasteners 502 (e.g., bolts, clamp screws). The sub-portions 500A-B may form an inner perimeter that substantially matches an outer perimeter of a roll bar. Sub-portion 500A may form channels 501 to receive the fasteners 502 (e.g., a cylindrical body of the fasteners) and sub-portion 500B may form threaded recesses to receive a threaded distal end of the fasteners 502. The portion 400 may form an opening 505 (e.g., channel, recess) configured to receive portion 410 (e.g., roll cage mount whip base adaptor). The portion 400 may form channels 504 to receive fasteners 506 (e.g., set screws) that engage with an outer surface (e.g., multiple Weldon flats for set screw options, hexagonal perimeter surface) of the portion 410. In some embodiments, a first sub-portion of portion 410 that enters the sub-portion 500B has a round (e.g., cylindrical) perimeter (e.g., to allow the portion 410 to swivel in the opening of the sub-portion 500B) and a second sub-portion of the portion 410 that enters the sub-portion 500B and engages with the fasteners 506 (e.g., to provide secured orientation of portion 410) has a polygon (e.g., polyhedral) perimeter (e.g., triangle, square, pentagon, hexagon, octagon, etc.).

In some embodiments, the portion 400 is secured to a roll bar by removing the fasteners 502, placing the sub-portions 500A-B around the roll bar, and securing the sub-portions to each other via the fasteners 502. The fasteners 406 are loosened, the portion 410 is rotated to orient the base component 110 in a substantially vertical orientation, and the fasteners 406 are tightened to secure against the portion 410.

Figure 6A:
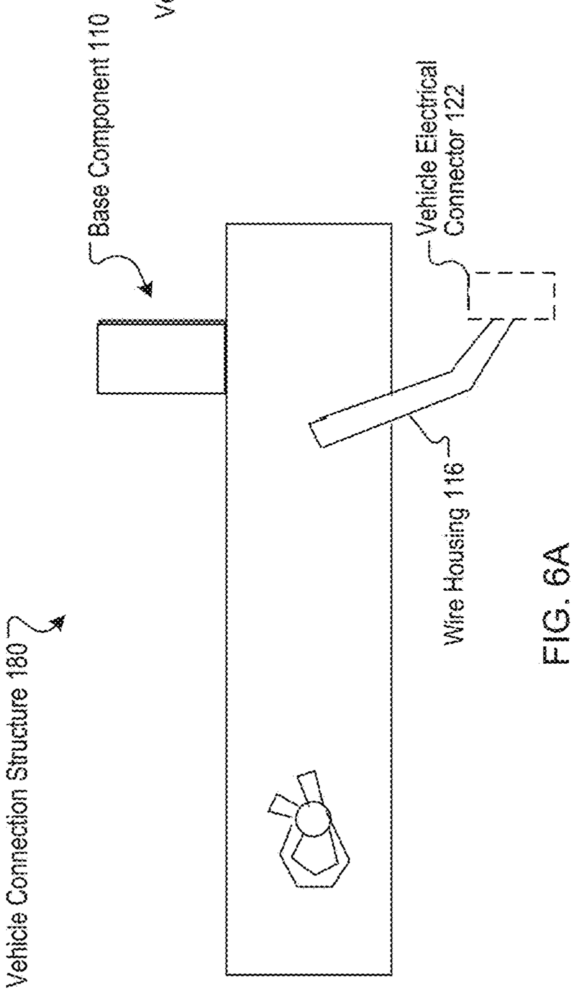
FIGS. 6A-C illustrate views of vehicle connection structures, according to certain embodiments.
Figure 6B:
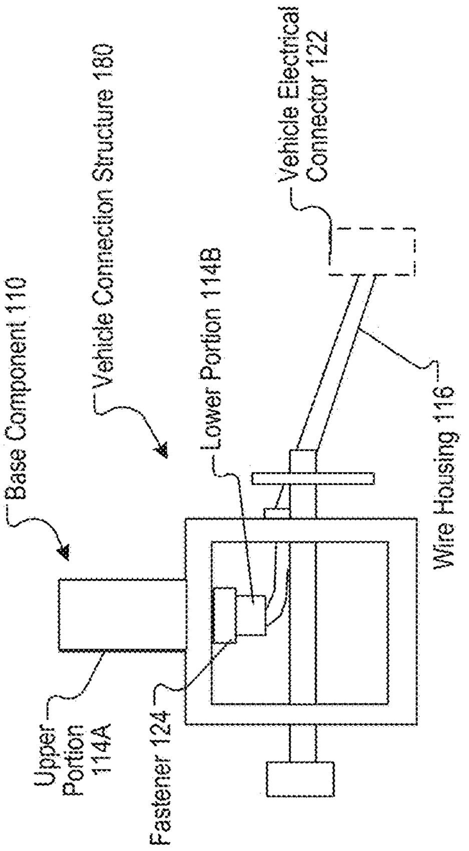
Figure 6C:
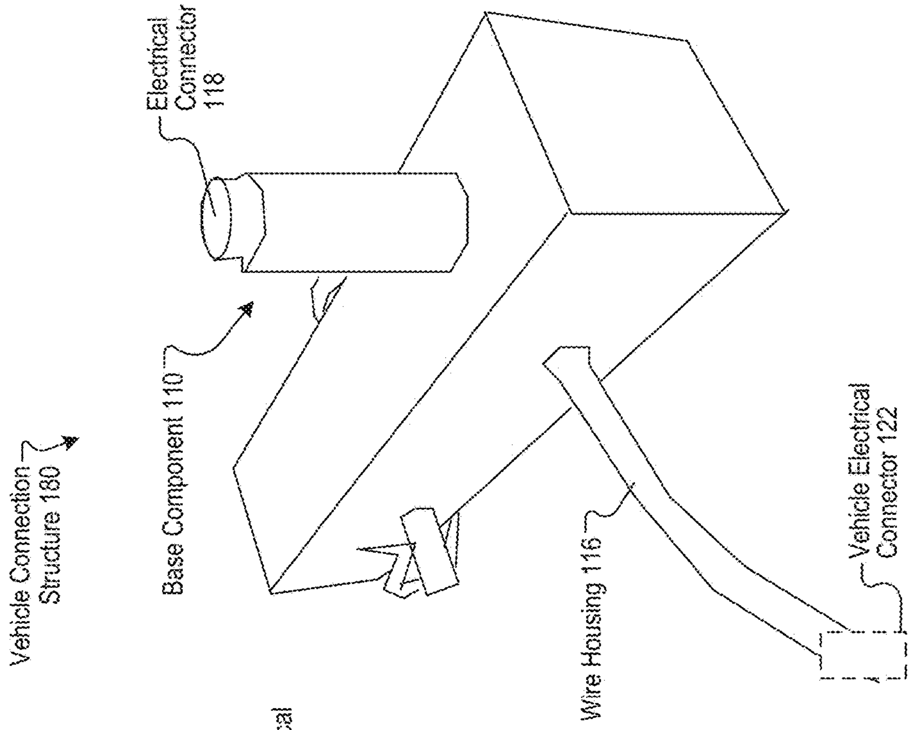

FIGS. 6A-C illustrate views of vehicle connection structures 180, according to certain embodiments. FIG. 6A is a side view, FIG. 6B is a rear view, and FIG. 6C is a front perspective view.

In some embodiments, vehicle connection structure 180 comprises a trailer-hitch adapter configured to be inserted in a trailer hitch of a vehicle (e.g., see trailer hitch 446 of vehicle 440 on FIG. 4G), route a body of a pin (e.g., that has a head that is larger than the opening formed by the trailer hitch adapter and the trailer hitch) through the trailer-hitch adapter and the trailer hitch, and couple a locking component (e.g., clip) to the end of the pin that routed through the trailer-hitch adapter and the trailer hitch.

The vehicle connection structure 180 may be hollow and a lower portion 114B of a base component 110 may be routed through an upper wall of the vehicle connection structure 180 and a fastener 124 may attach to the lower portion 114B of the base component within the vehicle connection structure 180. Wire housing 116 may be routed from the lower portion 114B, through a wall (e.g., sidewall) of the vehicle connection structure 180 to a vehicle electrical connector 122. The distance between the base component 110 and the pin through the vehicle connection structure 180 may allow the whip component 60 to not interfere with the vehicle or components mounted to the vehicle (e.g., tire).

Figure 7:
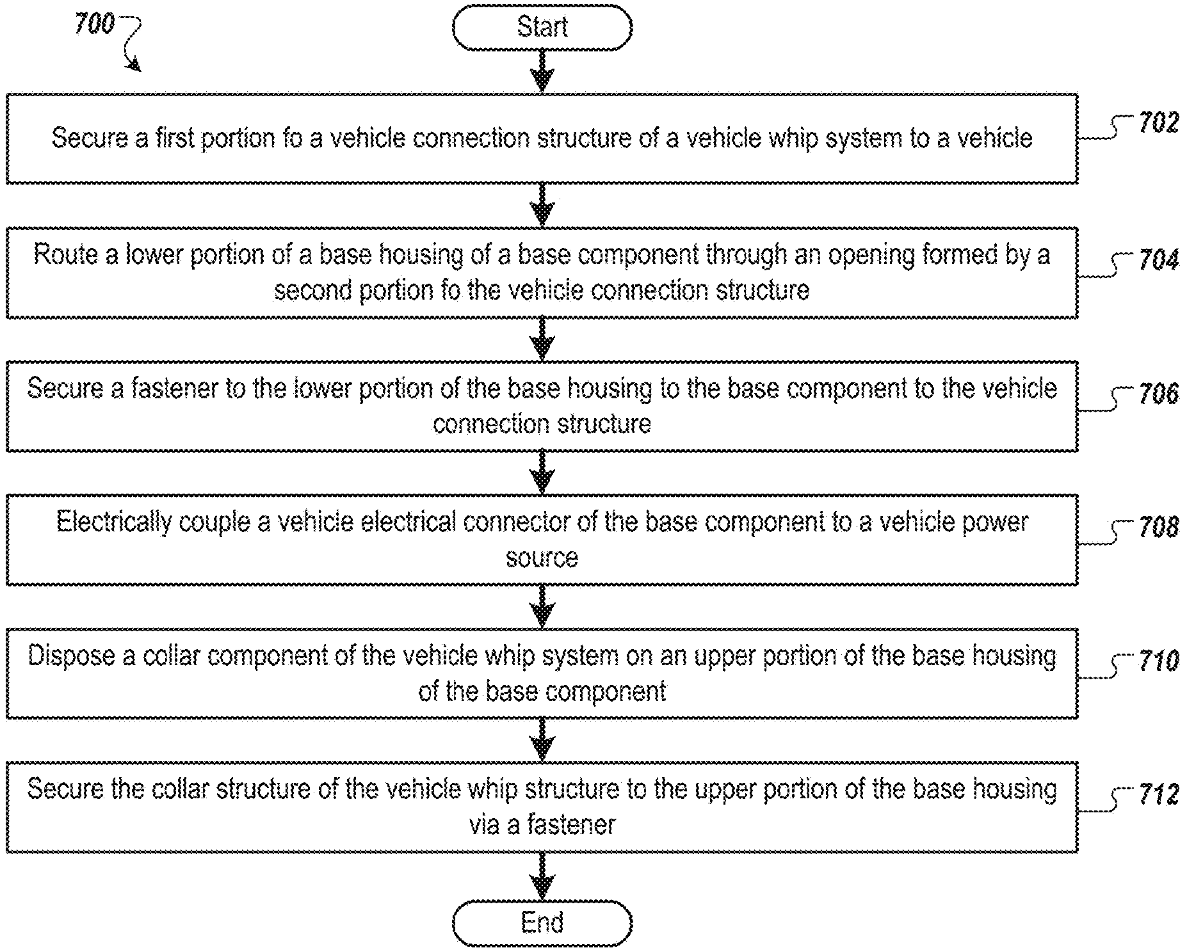
FIG. 7 illustrates a method of using a vehicle whip system, according to certain embodiments.

FIG. 7 illustrates a method 700 of using a vehicle whip system, according to certain embodiments. For simplicity of explanation, method 700 is depicted and described as a series of operations. However, operations in accordance with this disclosure can occur in various orders and/or concurrently and with other operations not presented and described herein. Furthermore, in some embodiments, not all illustrated operations are performed to implement method 700 in accordance with the disclosed subject matter. In addition, those skilled in the art will understand and appreciate that method 700 could alternatively be represented as a series of interrelated states via a state diagram or events.

Referring to FIG. 7, in some embodiments, at block 702 a first portion of a vehicle connection structure of the vehicle whip system is secured to the vehicle. In some embodiments, the vehicle connection structure is a bracket and the first portion is secured to a rear-tire mount of the vehicle via one or more bolts of the rear-tire mount. In some embodiments, the first portion of the vehicle connection structure is secured around a roll bar of the vehicle. In some embodiments, the first portion of the vehicle connection structure is a trailer-hitch adapter that is coupled to (e.g., inserted into) a trailer hitch of the vehicle.

At block 704, a lower portion of a base housing of a base component of the vehicle whip system is routed through an opening formed by a second portion of the vehicle connection structure. The second portion of the vehicle connection structure may be oriented in a substantially horizontal orientation (e.g., the first portion of the vehicle connection structure may be oriented in a substantially vertical orientation).

At block 706, a fastener (e.g., a nut with a threaded inner surface) is secured to the lower portion (e.g., a threaded outer surface of the lower portion) of the base housing to secure the base component to the vehicle connection structure.

At block 708, a vehicle electrical connector of the base component is electrically coupled to a vehicle power source. A first distal end of a flexible wire housing may be connected to the lower portion of the base housing and a second distal end of the flexible wire housing may be connected to the vehicle electrical connector. Wires may be routed through the lower portion of the base housing and wire housing to electrically couple an electrical connector disposed in the upper portion of the base housing and the vehicle electrical connector.

At block 710, a collar component of the vehicle whip system is disposed on an upper portion of the base housing of the base component. A whip component (e.g., whip structure and flag) may be coupled to (e.g., permanently attached to, integral to, etc.) the collar component.

At block 712, the collar component of the vehicle whip structure is secured to the base component via a fastener. In some embodiments, a fastener (e.g., set screw, thumb screw, etc.) is threaded though the collar component and secures to the outer surface of the upper portion of the base component.

Figure 8:
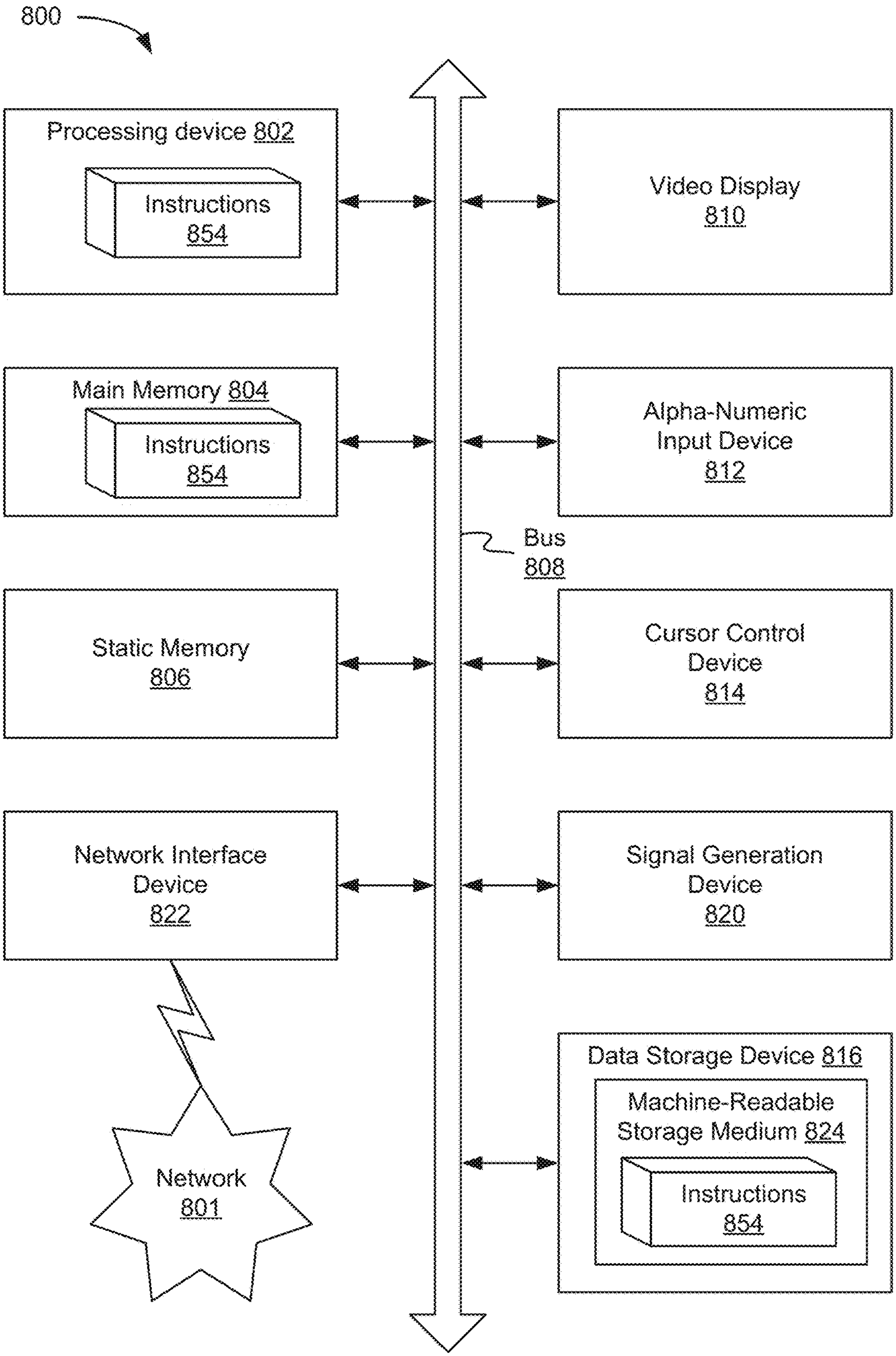
FIG. 8 illustrates a block diagram of a computer system, according to certain embodiments.

FIG. 8 illustrates a component diagram of a computer system 800 which may implement one or more methods described herein (e.g., transmitting and receiving signals to cause illumination of the vehicle whip system 100). A set of instructions for causing the computer system 800 to perform any one or more of the methods discussed herein may be executed by the computer system 800 (e.g., controller of vehicle whip system 100). In one embodiment, the computer system 800 may implement the functions of the controller of the vehicle whip system 100.

In one embodiment, the computer system 800 may be connected to other computer systems by a network 801 provided by a Local Area Network (LAN), an intranet, an extranet, the Internet or any combination thereof. The computer system may operate in the capacity of a server or a client machine in a client-server network environment or as a peer machine in a peer-to-peer (or distributed) network environment. The computer system may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, the term "computer system" shall also be taken to include any collection of machines (e.g., computers) that individually or jointly execute a set (or multiple sets) of instructions to perform any one or more of the methodologies discussed herein.

In one embodiment, the computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.) and a data storage device 816, which communicate with each other via a bus 808.

In one embodiment, the processing device 802 represents one or more general-purpose processors such as a microprocessor, central processing unit, controller, or the like. Processing device may include any combination of one or more integrated circuits and/or packages that may, in turn, include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 802 may therefore include multiple processors. The processing device 802 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor or the like.

The processing device 802 may be the processing device of a controller of the LED flag whip base assembly. The processing device 802 may include one or more interfaces to connect to one or more LEDs, etc.

In one embodiment, the computer system 800 may further include one or more network interface devices 822 (e.g., wireless module, etc.). The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and a signal generation device 820 (e.g., a speaker).

In one embodiment, the data storage device 818 may include a computer-readable storage medium 824 on which is stored one or more sets of instructions 854 embodying any one or more of the methods or functions described herein. The instructions 854 may also reside, completely or at least partially, within the main memory 804 and/or within the processing device 802 during execution thereof by the computer system 800; the main memory 804 and the processing device 802 also constituting machine-readable storage media. The computer-readable storage medium 824 may be a non-transitory computer-readable storage medium.

While the computer-readable storage medium 824 is shown as a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methods described herein. Examples of computer-readable storage media include, but not limited to, solid-state memories, optical media and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "transmitting," "receiving," "generating," "determining," "controlling," "providing," "maintaining," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

Various operations are described as multiple discrete operations, in turn, in a manner that is most helpful in understanding the present disclosure, however, the order of description should not be construed to imply that these operations are necessarily order dependent. In particular, these operations need not be performed in the order of presentation.

The terms "over," "under," "between," "disposed on," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

Various embodiments can have different combinations of the structural features described above. For instance, all optional features of a vehicle whip system described above can also be implemented in a vehicle whip system and specifics in the examples can be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of material, specific sizes, specific surfaces, specific structures, specific details, specific configurations, specific types, specific system components, specific operations, specific electrical connection types, etc. in order to provide a thorough understanding of the present disclosure. It will be apparent, however, to one skilled in the art that these specific details need not be employed to practice the present disclosure. In other instances, well known components or methods, such as specific and alternative material, sizes, surfaces, structures, details, configurations, types, system components, operations, electrical connection types, etc. have not been described in detail in order to avoid unnecessarily obscuring the present disclosure. In some embodiments, one or more of the dimensions described herein may be varied by +/−1%. In some embodiments, one or more of the dimensions described herein may be varied by +/−5%. In some embodiments, one or more of the dimensions described herein may be varied by +/−10%. In some embodiments, one or more of the dimensions described herein may be varied by +/−15%. In some embodiments, one or more of the dimensions described herein may be varied by +/−20%. In some embodiments, one or more of the dimensions described herein may not be used.

Although some of the embodiments herein are described with reference to LED and vehicles (e.g., and spare-tire mounts of vehicles), other embodiments are applicable to other types of light emitting devices, illuminating devices, electrical devices, objects and/or mounting surfaces. Although some of the embodiments herein are described with reference to a flag whip (e.g., coupled to a vehicle), other embodiments are applicable to other types of structures, such as a flagless whip, a component coupled to a vehicle, a component (e.g., flag whip) coupled to something that is not a vehicle, a component that conventionally has an exterior control wires, or the like. Similar techniques and teachings of embodiments of the present disclosure can be applied to other types of components, devices, systems, and assemblies (e.g., that mount in different planes to two objects, that have exterior control wires, etc.). In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task.

Furthermore, use of the phrases 'to,' 'capable of/to,' and or 'operable to,' in one embodiment, refers to some apparatus, hardware, and/or element designed in such a way to enable use of the apparatus, hardware, and/or element in a specified manner. Note that use of to, capable to, or operable to, in one embodiment, refers to the latent state of an apparatus, hardware, and/or element, where the apparatus, hardware, and/or element is not operating but is designed in such a manner to enable use of an apparatus in a specified manner.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

What is claimed is:

1. A whip system comprising:

a base component comprising a first electrical connector disposed in a base housing and one or more wires coupled to the first electrical connector and routed through the base housing;

a collar component comprising a second electrical connector disposed in a collar housing and configured to electrically couple with the first electrical connector, wherein the whip system comprises one or more features configured to align the base component with the collar component; and a whip component configured to couple to the one or more wires via the first electrical connector and the second electrical connector.

2. The whip system of claim 1, wherein the base component is configured to connect to at least one of a vehicle component or a vehicle connection structure.

3. The whip system of claim 1, wherein the one or more wires are configured to couple to a vehicle electrical connector that is configured to couple to a vehicle power source.

4. The whip system of claim 1, wherein the collar housing forms an interior volume configured to receive an upper portion of the base housing.

5. The whip system of claim 1, wherein the whip component comprises one or more electrical components configured to electrically couple to the one or more wires via the first electrical connector and the second electrical connector.

6. The whip system of claim 5, wherein the one or more electrical components comprise light emitting diodes.

7. The whip system of claim 1, wherein the whip component is connected to the collar component.

8. The whip system of claim 1, wherein the one or more features comprise a fastener configured to pass through an opening formed by the collar housing to secure the collar housing to the base housing.

9. The whip system of claim 8, wherein the fastener is configured to pass through the opening formed by the collar housing and insert into a recess formed by the base housing.

10. The whip system of claim 1, wherein the one or more features comprise:

an inner surface feature of the collar component; and an outer surface feature of the base component, wherein the inner surface feature and the outer surface feature are configured to be disposed adjacent to each other responsive to at least an upper portion of the base component being received into an interior volume of the collar housing.

11. The whip system of claim 1, wherein the one or more features comprise:

a substantially flat portion of the collar component; and a groove portion of the base component, wherein the substantially flat portion and the groove portion are configured to be disposed adjacent to each other responsive to at least an upper portion of the base component being received into an interior volume of the collar housing.

12. The whip system of claim 1, wherein the one or more features are configured to align the first electrical connector with the second electrical connector.

13. The whip system of claim 12, wherein the first electrical connector is a first pin connector and the second electrical connector is a second pin connector.

14. A whip system comprising:

a base component comprising:

a base housing comprising an outer side surface forming an outer feature; and a first electrical connector disposed in the base housing; and a collar component comprising:

a collar housing comprising an inner side surface forming an inner feature; and a second electrical connector disposed in the collar housing, wherein the outer feature and the inner feature are configured to align the first electrical connector with the second electrical connector.

15. The whip system of claim 14, wherein the outer feature comprises a substantially flat portion, and wherein the inner feature comprises a groove portion.

16. The whip system of claim 14, wherein a whip component is connected to the collar housing.

17. The whip system of claim 14, wherein the base component is configured to connect to at least one of a vehicle component or a vehicle connection structure.

18. A base component of a whip system, the base component comprising:

a base housing comprising an outer side surface that has a substantially curved portion and a substantially planar portion;

a first electrical connector disposed in the base housing; and one or more wires routed through the base housing, a first distal end of the one or more wires being coupled to the first electrical connector, a second distal end of the one or more wires being coupled to a vehicle electrical connector, wherein the substantially planar portion of the outer side surface of the base housing is configured to align the first electrical connector with a second electrical connector of a collar component of the whip system.

19. The whip system of claim 18, wherein a whip component is connected to the collar component.

20. The whip system of claim 18, wherein the base component is configured to connect to at least one of a vehicle component or a vehicle connection structure.

* * * * *